United States Patent [19]
Hart

[11] Patent Number: 6,154,765
[45] Date of Patent: Nov. 28, 2000

[54] DISTRIBUTED DIGITAL RULE PROCESSOR FOR SINGLE SYSTEM IMAGE ON A CLUSTERED NETWORK AND METHOD

[75] Inventor: Edward F. Hart, American Fork, Utah

[73] Assignee: Pasocs LLC, American Fork, Utah

[21] Appl. No.: 09/271,772

[22] Filed: Mar. 18, 1999

Related U.S. Application Data

[60] Provisional application No. 60/078,477, Mar. 18, 1998.

[51] Int. Cl.[7] .................................................. G06F 15/16
[52] U.S. Cl. ............................ 709/201; 709/208; 712/28
[58] Field of Search ................................. 709/208, 201, 709/204, 209, 245, 249, 211; 370/409, 401; 712/28, 31, 35; 706/6, 15, 41, 42, 47, 916

[56] References Cited

U.S. PATENT DOCUMENTS

| | | | |
|---|---|---|---|
| 5,155,801 | 10/1992 | Lincoln | 706/20 |
| 5,197,130 | 3/1993 | Chen et al. | 712/3 |
| 5,259,066 | 11/1993 | Schmidt | 706/50 |
| 5,303,332 | 4/1994 | Kirk et al. | 706/50 |
| 5,357,612 | 10/1994 | Alaiwan | 709/216 |
| 5,371,852 | 12/1994 | Attanasio et al. | 709/245 |
| 5,524,176 | 6/1996 | Narita et al. | 706/2 |
| 5,615,308 | 3/1997 | Ando et al. | 706/48 |
| 5,701,394 | 12/1997 | Arita et al. | 706/10 |
| 5,704,010 | 12/1997 | Künemund | 706/4 |
| 5,729,761 | 3/1998 | Murata et al. | 710/14 |
| 5,796,917 | 8/1998 | Matranga et al. | 706/4 |
| 5,805,572 | 9/1998 | Bernabeu-Auban et al. | 370/255 |
| 5,819,242 | 10/1998 | Matsuoka et al. | 706/2 |
| 5,828,812 | 10/1998 | Khan et al. | 706/2 |
| 5,835,771 | 11/1998 | Veldhuizen | 717/5 |
| 5,845,071 | 12/1998 | Patrick et al. | 709/215 |
| 5,860,026 | 1/1999 | Kitta et al. | 710/33 |
| 5,864,341 | 1/1999 | Hicks et al. | 712/214 |

OTHER PUBLICATIONS

*In Search of Clusters*, Prentice–Hall pp. 356–357, pp. 366–367.

*Primary Examiner*—Mehmet B. Geckil
*Attorney, Agent, or Firm*—Thorpe, North & Western, LLP

[57] ABSTRACT

A distributed digital rule processor to create a single system image (SSI) on a cluster of von Neumann processors. The rule processing engine has a group of digital rule nets each having their own local bindery and local controllers which are interconnected by a global bindery. Slave translators are interfaced to the global bindery to receive rule calls from the rule nets and return statuses. A compiler maps the typical source code instructions into groups of rules which are stored in the rule nets' storage area. The rules contain groups of input variables and output variables. The output variables of a calling rule become the input and data for the called rule. Slave application processes on the von Neumann processors perform slave activities for the slave translators, as the rule nets are unable to manipulate data. Rules received from the rule nets by slave translators are processed and processed data or return statuses are sent back to the nets for further instructions. The rule nets contain the code compiled by the programmer and the application data is stored in the global buffers. This separates the code from data. The digital rules include node, processor, and thread addressing variables to permit extending the model to handle multiple nodes in a Wide Area Network, Local Area Network, System Area Network, or cluster.

29 Claims, 9 Drawing Sheets

DISTRIBUTED DIGITAL RULE PROCESSOR FOR SINGLE SYSTEM IMAGE ON A CLUSTERED NETWORK AND METHOD

This application claims priority from a provisional application Ser. No. 60/078,477 filed on Mar. 18, 1998.

BACKGROUND

1. The Field of the Invention

This invention relates generally to distributed parallel processing on a computer network, and more particularly to a method and apparatus for parallel processing digital rules in rule nets and slave translators which are interconnected by a global controller and bindery.

2. Background.

Many organizations are now dependent on computers for the management of their data. Because of the mission critical nature of computer applications like web servers, accounting, point of sale, inventory and customer information, even small organizations need their computer systems to be running virtually all the time. Computer users desire their systems to be fast and reliable, but current von Neumann processors are coming close to the limit of their capacity. In addition, von Neuman processors are sometimes unstable and can crash. The increased processing requirements for virtual reality graphics and client server network applications also justify the need for faster, affordable and more stable computers.

One way to speed up a computer is to increase a von Neumann single processor's speed. This has been occurring at a steady rate in the computer industry through miniaturization and circuit optimization. Another method of increasing computer performance is by adding more von Neumann processors to a single machine, also known as parallel processing. Unfortunately, conventional parallel processing machines have throughput bottlenecks and software which is difficult to debug. It is also known that von Neumann processors on separate machines or nodes can be connected in configurations such as client-server or neural networks. Some neural net models have even been designed which can process digital information and return a result.

Although adding more processors may help increase the speed of a computer it does not necessarily increase the reliability of the computer or its operating system. The popular operating systems on microcomputers such as Macintosh, Windows, Windows NT, Unix, and NetWare unpredictably fail from time to time. Overcoming single computer failures using multiple computer systems as a backup for systems that fail is known as redundancy.

One solution to single server failure is the concept of clustering. A cluster is a group of three or more servers (nodes) connected on a network which have high availability because they work together as one logical entity. When an independent server within the cluster fails, the workload of that server, and the services or applications it was providing, are distributed to the remaining servers in the cluster. Redundancy in a cluster provides high availability of data, network services and applications to users. The transfer of an application from a failed server to a remaining server is called failover. In clustering, the performance of the servers is also balanced as the servers allocate the network load to match the hardware capabilities of each server in the cluster. In order for the data on hard disk drives to be visible to the various nodes in the cluster, a shared disk sub-system is connected to all nodes in the cluster. If data were stored on a local hard drive of one of the servers, that data would be unavailable when that server crashed. Distributed file systems allow for all running servers to access the same data without corruption.

Outside users want to see the cluster as a single logical entity. This single system image (SSI) is achieved through certain characteristics of the cluster configuration. First IP (Internet Protocol) addresses which clients connect to are allowed to move from one server to another as part of failover. The virtual IP addresses, along with the software applications which use the IP address are moved from node to node when necessary.

Group membership software detects which nodes in a cluster are running, and cluster resource management software decides where the cluster resources reside (e.g. IP addresses, running application, disk subsystems). The decision as to which node gets a resource can be based on a cluster node preference list or some load balancing policy. The cluster resource management software does failover, failback and resource migration to adjust the load of the software on each node or server.

In a clustering system, the network client must have reconnection smarts so that the user cannot tell that behind the scenes a current connection to a server failed, and a new connection to the same IP address on another server has occurred. A major drawback with reconnection is the loss of gray data. An example of gray data loss is a transaction to a database on the server, which was not completed nor stored on the shared disk subsystem, thus the incomplete transaction will have to be started over. If the gray data remains in memory, then the transaction can automatically pickup where it stopped without restarting. If the gray data was erased from memory the transaction will have to be re-entered by the user when the application restarts on a remaining clustered server. Gray data recovery is a complex process and requires complex algorithms on the client side, in the database or on the servers. It is difficult for an application which runs on only one server at a time to prevent gray data loss because inside the cluster, the servers (nodes) are individually known to the group membership software and the cluster resource management software but they are not known to an individual application.

Current applications on a cluster are limited to running on one server. Of course an application will failover to another server if the server it is running on crashes, but it cannot automatically use the resources of all the servers in the cluster. Clusters provide a Single System Image (SSI) to users outside a group of network nodes, but a SSI from a software developer's perspective inside the cluster does not exist. So currently, programmers who desire to create applications which use the resources of more than one server in the cluster must organize their application to directly address the separate servers. This is a very complex and daunting task because of the necessary network knowledge and the high complexity of the clustering resource management software. What is needed is a parallel, distributed application execution environment on a cluster of von Neumann processors which appears as a single system image (SSI) to a software developer.

OBJECTS AND SUMMARY OF THE INVENTION

It is an object of the present invention to provide a distributed digital rule processor and method which create a true SSI for distributed software application execution, inside or outside a networked von Neumann processor cluster by broadcasting digital rules which are processed by rule nets and slave translators.

It is an object of the present invention to provide a distributed digital rule processor and method to allow the sharing of gray data between servers and the hiding of servers or von Neumann processors as slaves to a layer of digital rules.

It is another object of the invention to provide a distributed digital rule processor and method to create, store, and execute complex digital rules over a clustered network of von Neumann processors.

It is yet another object of the invention to provide such a distributed digital rule processor and method for executing digital rules and utilizing the high reliability benefits of a networked cluster of servers.

The distributed digital rule processor creates a single system image (SSI) and executes digital rules on a clustered von Neumann processor network. The processor has a plurality of rule nets each having an ordered list of rules and each rule has input variables and output variables. The rule nets can broadcast rules to other rule nets or slave translators. A plurality of slave translators executes the rules received from the rule nets and returns the results and data from the executed rules to the calling rule net. A global controller is coupled to the rule nets and slave translators which has a global bindery, a global data memory, and a current broadcast state. A global rule distribution queue is coupled to the global controller to store pending digital rules and broadcast rules to the rule nets and slave translators as signaled by the global controller.

In one embodiment of the invention, a computer programmer compiles source code through a compiler into digital rules. These digital rules are stored in the rule nets. Slave translators are also provided to convert rule calls from the rule nets, which may include data, into API calls to be executed by a von Neumann host where a slave translator resides. The results returned from the API call or von Neumann processor calls are then returned to the rule nets. A global controller has a global queue to arbitrate and store the rule calls between the rule nets and the slave translators. The global controller also stores global data and current processing state. The rules are a dynamic length group of variables connected together which include at least the Function State number of the rule and the inputs and outputs of the rule.

Additional objects and advantages of the invention will be set forth in the description which follows, and in part will be apparent from the description, or may be learned by the practice of the present invention. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION OF THE PREFERRED EMBODIMENTS

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

Figure 1:
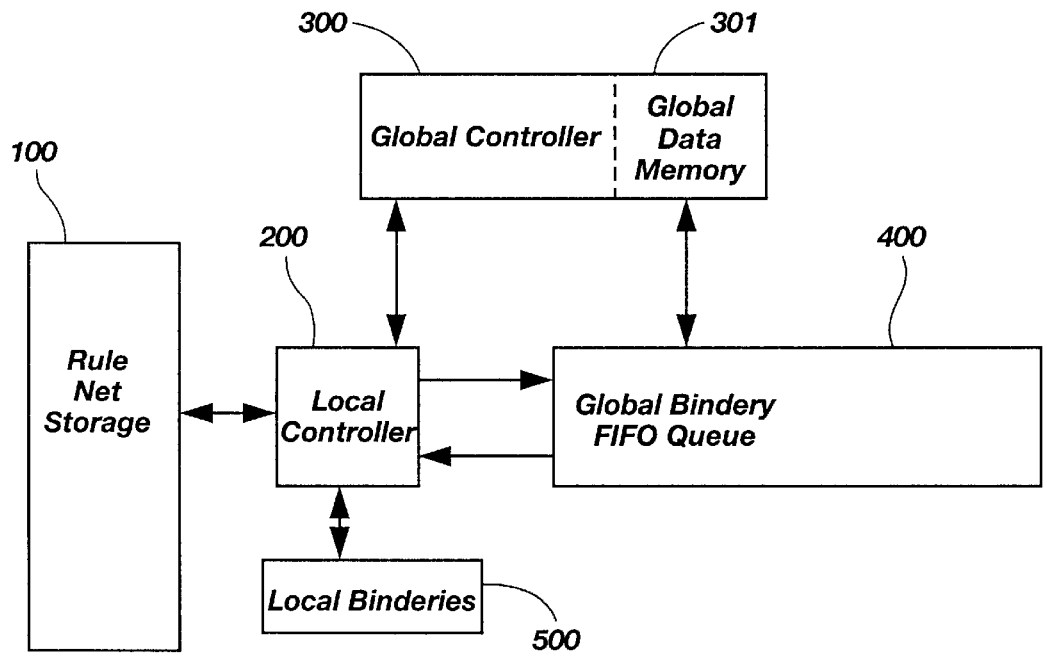
FIG. 1 shows a distributed digital processor and the relationships between the global controller, global bindery and an individual rule net.

Referring now to FIG. 1, this invention allows an application to be compiled through a specialized compiler which creates a number of digital rules to be executed in parallel over a number of processing nodes which are connected by a bus, network or a similar communications device. Even if one of the processing nodes crashes, the distributed rule processing environment is designed to continue executing the program without the loss of data through mechanisms described more fully herein.

Figure 2:
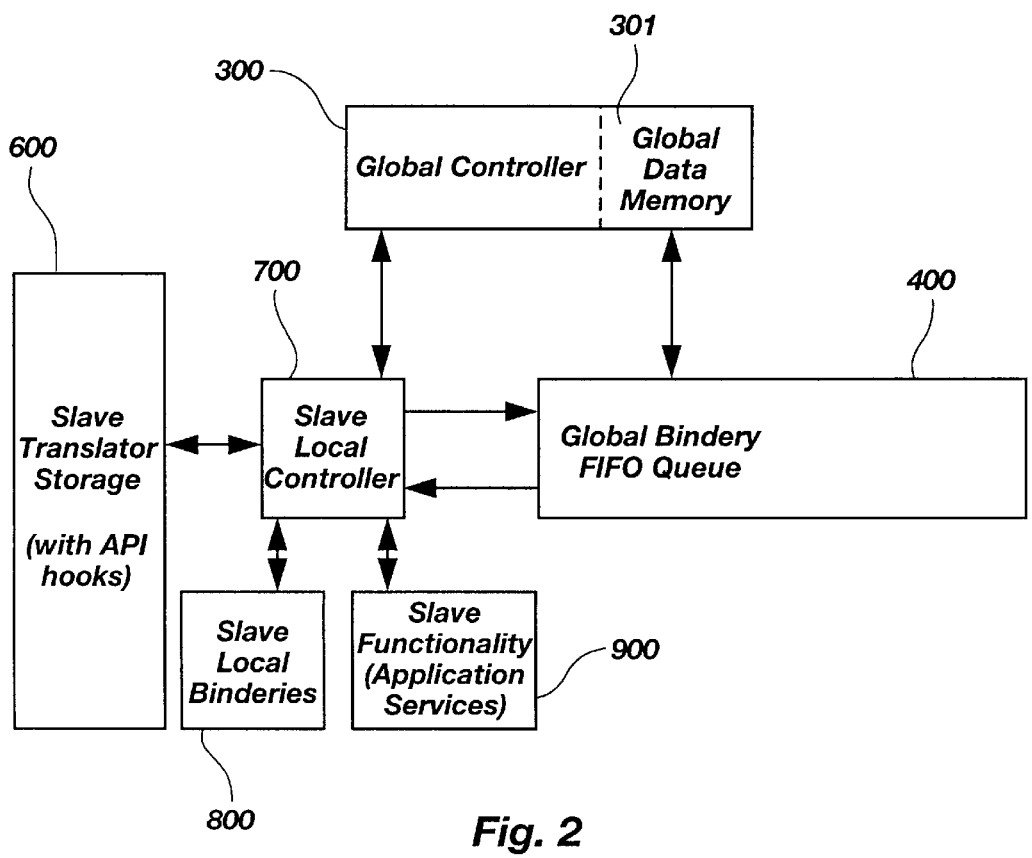
FIG. 2 shows a distributed digital processor and the relationships between the global controller and an individual slave translator.

The specialized compiler maps source code, such as a modified "C" or Java programming language, into sets of rules to be instantiated (loaded and stored) in a rule net storage 100. The compiler is designed to create rules which are unique and not minimizable. A digital rule can contain parameter information and as will be seen through this disclosure, may be compared to a function call or function in a conventional programming language. (Referring now to FIG. 1, these rule nets can call digital rules (i.e. functions) on other rule nets 100 or they may call the digital rules on slave translators 600 (FIG. 2). The digital rules have no direct data manipulation capabilities because they have no registers or data storage. A local controller 200 does all the data processing, taking orders from state chances and rules sent over the global bindery by the global controller 300 from the other rule nets. Return states to the rule nets are also broadcast over the global bindery 400.

FIGS. 1–2 illustrate a distributed digital processor and the relationships between the parts of the processor. Initially an overview of the relationships between each part of the distributed digital processor will be described, followed by a detailed explanation of each part and how they interrelate. A rule net storage 100 stores the digital rules. FIG. 1 shows one rule net 100 but multiple rule nets 100 can co-exist on the same node or distributed across several nodes. Source code created by a programmer is compiled by a specialized compiler into digital rules which are a conjunction of boolean variables to store states or values. These compiled rules are stored in the rule net storage 100 until they are executed. There are two types of rules in this invention: 1)

a rule which is stored in a rule net 100 with its Function State and accompanying input variables and output variables, and 2) a broadcast rule which contains many of the elements of a rule in a rule net but it is broadcast without a Function State and has a different format as described in tables later in this description.

A local controller 200 is coupled to the rule net storage 100 and receives broadcast messages from the global controller 300 as to which rule in the rule net 100 should be recognized and what rule should then be broadcast to the global controller 300. The local controller 200 also broadcasts messages (calls) as to which digital rules should be recognized (i.e. executed) in other rule nets or slave translators as a result of the rules retrieved from the rule net storage 100 and executed in the local controller 200. Each local controller 200 has one or more von Neumann processors to allow it to process rules and make broadcasts.

A local bindery 500 is coupled to the local controller 200 to store the current state of a thread of execution from the program which is being executed in a local controller 200 through the rules stored in the rule net storage 100. The current state is called the Function State. The local bindery 500 for each rule net also stores parameters passed when a rule is received or broadcast. This allows each rule net to remember the parameter values which were broadcast and use them throughout the rule's operation. The parameters are buffer handle numbers or constants which the von Neumann processors use to process data passed from the global data memory 301 or from other rule nets 100 and their local controllers 200. Multiple instances of the local bindery 500 can exist to service multiple threads of execution and recursion for the application, or threads from different applications. Based on this disclosure, it can be seen that the local bindery contains similarities to a stack in conventional von Neumann architecture. Further references to a "rule net" will refer to a rule net storage 100 combined with a local controller 200 and its local binderies 500.

The local controller 200 is connected to a global controller 300 which stores the overall state of the digital processing network and controls the broadcast flow of the rules. The global controller 300 contains a global data memory 301 to store the global data for the executing application or applications. The global data could be stored in another area separate from the global controller as long as the data can be directly accessed by the global controller 300. The global data memory 301 must also be separate from the rule nets. This creates a separation between the code and data which is not found in von Neumann machines and it creates an inherently more stable system that cannot be easily corrupted. Von Neumann machines have the drawback that executing code can sometimes overwrite itself or its data thus crashing the executing code. For example, exceeding an array bound is likely to destroy code or other data.

A global bindery 400 is coupled to the global controller 300. The global bindery 300 has a queue to store digital rules which are individually broadcast to the local controllers 200 and slave local controllers 700 on the communications network. Digital rules which are broadcast by the local controller 200 for execution by other local controllers and their respective rule nets are received by the global controller 300 and stored in the global queue 400. The global queue 400 is preferably a first in first out (FIFO) queue which has a number of rule storage positions equal to the number of rule nets in the network.

FIG. 2 shows the configuration of an individual slave translator coupled to the global controller 300 and global bindery 400 in the distributed digital processor. The slave translators operate in parallel with the rule nets to process the compiled application. The slave translator storage 600 and the slave local controller 700 may be stored on the same node as the rule nets and their local controllers, or spread across other nodes on the bus or network. The slave translators differ from the rule nets in that they actually perform the requested work for the application as opposed to the rule nets which control the organization of the program. The slave translator also has digital rules stored in the slave translator storage 600. As mentioned, the digital rules have no direct data manipulation capabilities, so the von Neumann processors coupled to the slave local controller 700 do all the data processing. The slave local controller 700 takes orders from state changes and rule broadcasts sent by the rule nets through the global controller 300 over the global bindery 400 and it sends return states to the rule nets over the global bindery 400.

When a slave translator rule executes, it calls an application programmer interface (API) on the host von Neumann node which will actually perform work. For example, a database API may be called to do work on the global data passed from the global controller 300. The data is then returned to the rule net which called the slave translator rule. Slave rules do not call other rule nets and they do not call other slave translators directly because this would result in gray data which could be lost.

The slave local controller 700 operates in much the same manner as the rule net local controller 200 in that it receives broadcast rules from the global controller 300 and compares them to the rules in its slave translator storage 600. The difference between the slave local controller 700 and the rule net local controller 200 (FIG. 1) is that the slave local controller 700 calls slave functionality 900 through API calls and processes the actual work for the user's application. These API calls will be calls to applications such as database, email, hardware peripherals or operating system services. It should also be noted that the slave local bindery 800 is similar to the local bindery 500 because it stores the states of each thread being processed by the slave local controller 700. Multiple copies of the slave local bindery 800 can exist to process recursion or multiple threads of API execution. The slave local bindery 800 also stores the parameters that are passed with a particular broadcast rule and the source address of the calling rule net. It should also be mentioned that global controllers, local controllers, and API services must be serviced by at least one slave CPU on a given chassis. Every global controller 300 must have at least one von Neumann processor accompanying it. The slave local controllers 700 and rule net local controllers 200 and global controller 300 may share the same von Neumann processor or each have their own dedicated von Neumann processor.

The distributed digital processor of the current invention has a communication cycle. During each cycle, each local controller 200 and slave local controller 700 checks the rule that is being broadcast from the global bindery 400 by the global controller 300 to see if it recognizes the broadcast rule. In other words, each local controller 200 checks to see if the broadcast rule matches a rule listed in its rule net storage 100 or slave translator storage area 600. If the broadcast rule matches a rule in a specific controller's storage, the rule net or slave translator raises a flag that it desires to receive that rule and process it. This flag is actually broadcast on the network and is known as an Accept broadcast. The broadcasting rule net (or original calling rule) then loops in a Wait state at a wait rule and waits until it receives an Accept or it eventually times out. When an Accept is broadcast, the broadcasting rule net then picks the first rule net or slave translator who accepted the rule (broadcasted an Accept) and stores the From Node variable's value which is the address of the calling rule net, so further rules in this thread may be sent directly to that rule net. The accepting rule net or slave translator then processes the rule to completion and broadcasts a Complete rule broadcast to the calling rule net, including any data that may have been processed (by slave translators). Meanwhile the calling rule net has been in a Wait state to wait for the Complete. When the calling rule net receives the Complete from the first original accepting rule net for slave translator, it knows the rule is complete and it captures the completed data broadcast with the Complete broadcast.

Since this is a parallel system, many rule nets may Accept the broadcast call and they may run to completion for that first call. Then when they broadcast their Accept they are ignored by the calling rule net because it will only recognize the first accepting rule net whose address it has stored. Then the calling rule net will send the further rules in the current thread to the same rule net. Although many rule nets will finish one rule this is not as wasteful as it appears because usually the first call is just to initiate the transaction, in other words a "handshake" before more work is sent. Further rules are not sent to the rule nets who were not the first to Accept and they are ignored. Therefore, they actually do very little work for a general broadcast.

Rules will be sent with global data if there is any to be transferred. The local controller 200 will acknowledge that it received the rule and then process it along with global data transferred and then stored in the local bindery 500. Then the local controller 200 will broadcast a rule which needs to be processed by other rule nets. These broadcast rules will be stored by the global controller 300 on the global bindery 400 (FIFO queue). Then the communication cycle begins again as each local controller 200 and slave local controller 200 checks the global bindery to see if the rule broadcast by the global controller 300 matches a rule in its rule net storage 100 or slave translator storage 600.

It should be realized that there are many local controllers 200 and rule nets operating simultaneously to process the rules stored in the global bindery 400 and broadcast by the global controller 300. Depending on the processing power desired for the global controller 300, up to eight processors could be reasonably assigned to one global controller 300 and global bindery 400. Even more processors could be used depending on the size of the address variable defined to address the processors.

Figure 3:
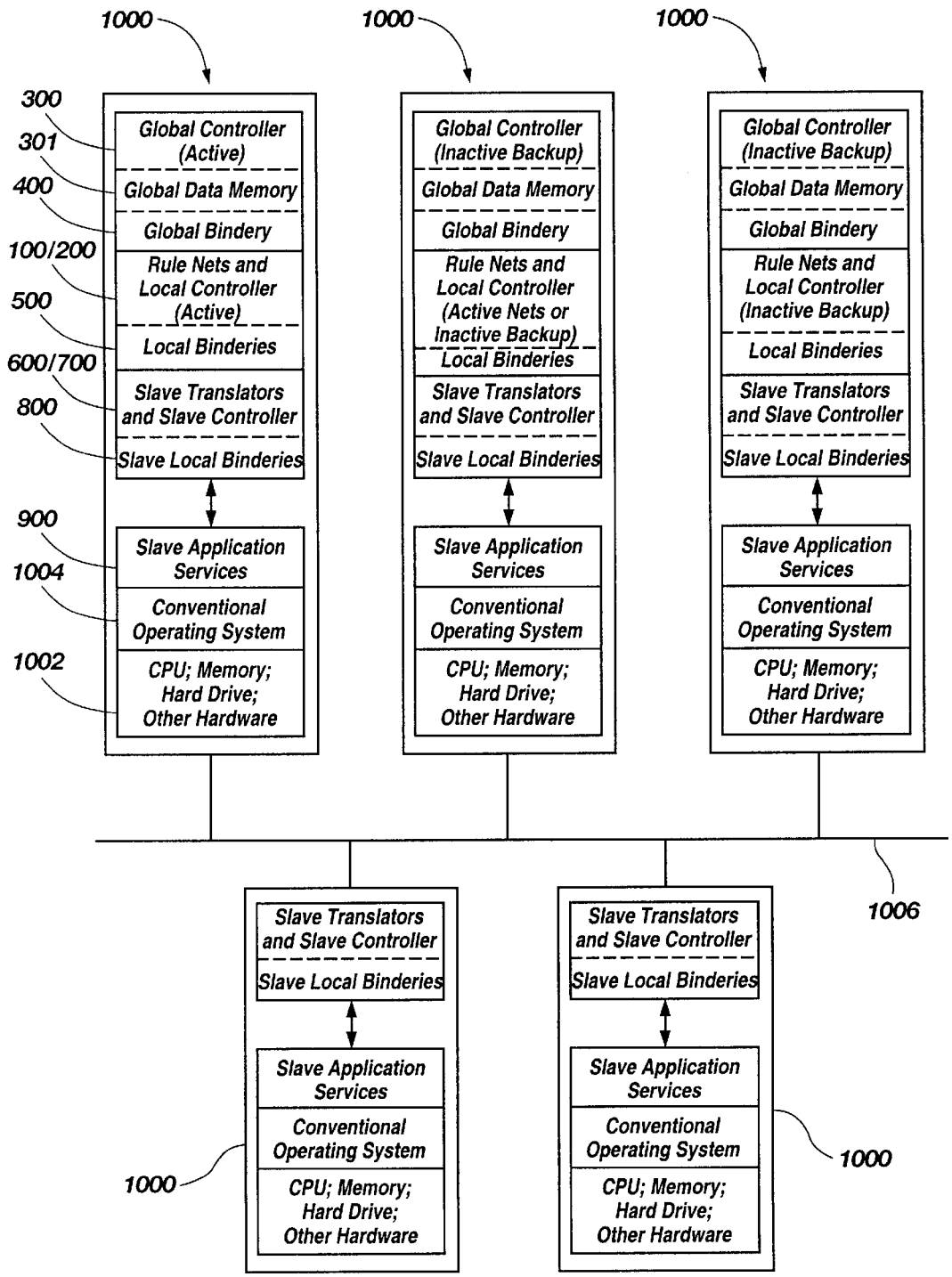
FIG. 3 shows a distributed digital processor with a communication bus and several connected processing nodes.

FIG. 3 shows a distributed digital processor with a communication bus 1006 and several connected individual processing nodes 1000. The communication bus 1006 may be a bus such as a network radio network or a bus using another common protocol such as ISA or PCI. The processing nodes may each reside within their own physical chassis or box or combined together on a single board inside a single chassis box. Each processing node 1000 is independent and will have at a minimum its own hardware 1002 with at least one von Neuman processor, a dynamic storage device such as RAM, and a static storage device such as a hard drive or other static storage array. Additional von Neumann processors may be added to the individual processing nodes in a known configuration such a symmetric multi-processing (SMP) to increase the speed of the individual processing node 1000. Of course other input and output hardware could also be connected to the individual processing node 1000, such as a conventional monitor, keyboard or mouse, etc. A conventional operating system 1004 also runs on the nodes 1000 such as NetWare, UNIX, Windows, Windows NT, DOS or some other type of operating system. Running on the operating system 1004 are the conventional slave application services 900 such as the operating system APIs, database applications, web services, email or other applications. The slave translators 600/700 call the slave application services 900 to perform work on the global data received from the global controller 300.

The global controller 300 and global bindery 400, are backed up (replicated) on each processing node 1000 connected by the communication bus 1006. Only one global controller 300 and global bindery 400 at a time will be active to control a given group of rule nets and slave translators. So if a processing node 1000 fails, then the backup copy of the global controller 300 and global bindery 400 on another processing unit 1000 will take over at the last point it was copied and no gray data will be lost. Then one of the remaining rule nets 100/200 which has not received an Accept or Complete back from a rule broadcast will re-broadcast that rule and rule processing will resume. Although the global controller 300 and the global bindery 400 will be replicated across several nodes, it only needs to be replicated enough times to create a stable system and not necessarily across every node on the system. The rule net storages 100, their local controllers 200 and local binderies 500 will also be copied to a selected number of nodes in case the executing rule net fails. Even though the time it takes to make the backup copies of the digital processor's components does reduce the efficiency of the invention, this a trade-off for greater stability. The use of a low latency, high bandwidth interconnect such as Virtual Interface Architecture (VIA), will reduce the backup overhead.

All of the active rule nets can reside on one node and then be copied to other nodes or the active rule nets can be divided between many nodes and then backed up to other nodes. For example, if there were 3 active rule nets in the system all three could reside on one node (A,B,C) as a group or they could each reside on separate nodes where the first node has active rule net layer A, the second node has active rule net layer B, and the third node has active rule net layer C. All of these rule nets can then send broadcast rules to each other and backup copies are also made of the active rule nets on other nodes.

Slave translators only exist in conjunction with the slave application services 900 provided by an API on a specific node. For example, a slave translator may be mapped to a specific database API. In this case, a slave translator can only be used on the specific processing node 1000 where an actual database resides. For the sake of stability, a slave translator mapped to a database API should exist on more than one processing node 1000, so that if one processing node crashes another slave translator can take over those API services. If a slave translator contains rules which cannot be processed on a specific node 100, those rules will be inactive.

Figure 4:
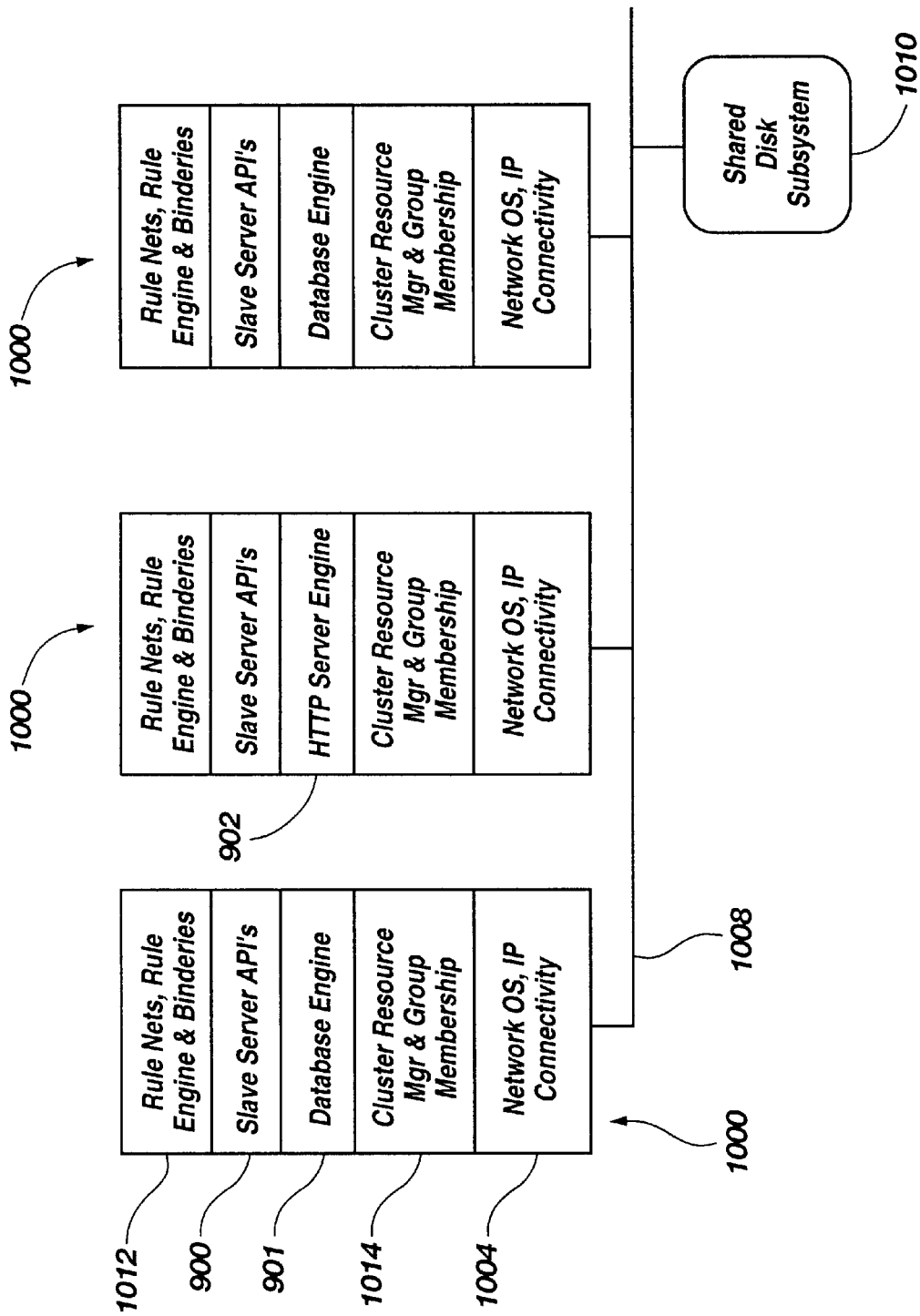
FIG. 4 shows a distributed digital processor on a clustered network.

FIG. 4 shows a distributed digital processor on a clustered network. The distributed digital rule processor exists on multiple nodes in a Local Area Network (LAN) or cluster. Network address variables are combined and broadcast with the digital rules to handle the addressing of multiple network nodes, multiple processors in each node, and multiple threads in each processor. The communication bus 1008 shown is preferably a high speed LAN. The communications bus 1008 could also be a wide area network (WAN) or even the Internet. Each individual processing node 1000 has a global rule engine, rule nets, slave translators and binderies

1012 to execute rules over the specified network and utilize the resources of each individual processing node 1000. The individual nodes 1000 on the network in FIG. 4 are network servers and have a network operating system such as Novell's NOS, Microsoft's Windows NT, UNIX or another networked operating system. A global address array, known as the other Node Array, is coupled to each rule net local controller 200 to map the value of each address variable's thread number and source group number to the slave translator's node address (chassis), von Neumann processor and thread address. This process will be described in detail later.

In addition to the networked software, there is a cluster resource manager 1014 which can take care of failover, failback and resource migration. An example of an application running on the cluster is shown as a database engine 901 or a HTTP server engine 902. If one server node 1000 were to fail, these slave application services 900 would be transferred to another server node 1000. The slave application services 900 can call operating system services 1004 or other application services which are not shown.

Figure 5:
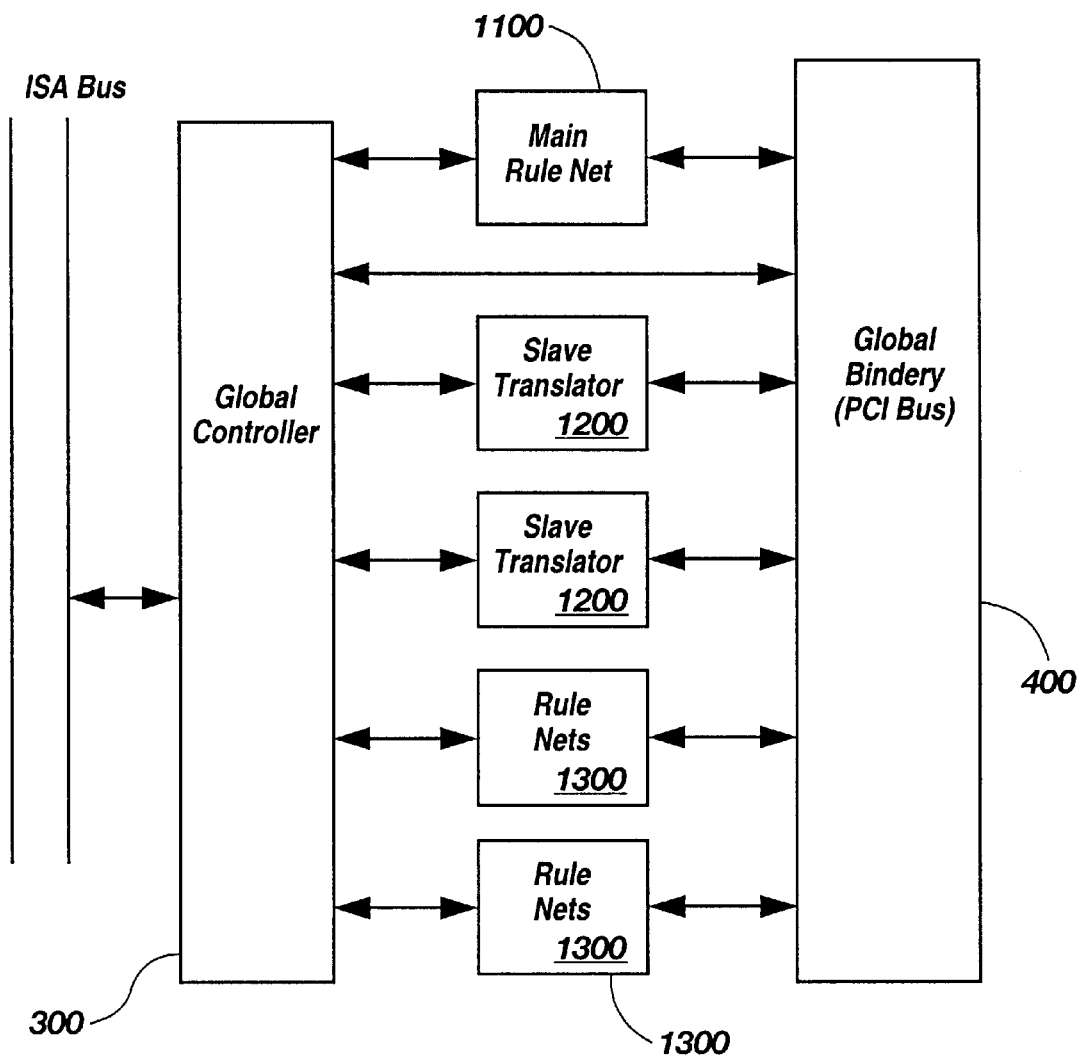
FIG. 5 shows a distributed digital processor implemented in hardware using a PCI and ISA bus.

FIG. 5 shows a hardware implementation of the invention where each unit is a hardware card connected within the same physical chassis. Each node on the system shown in FIG. 5 requires its own von Neumann processor(s) with an ALU and its own conventional operating system. Each node also requires its own random access memory (RAM) and hard drive like the individual node 1000 described in FIG. 3. The main rule net 1100 is the rule net that would receive the first broadcast rule and then broadcast rules which would be received by the other rule nets 1300 and the slave translators 1200. The slave translators 1200 each have slave applications running on their operating system which would process the actual work requests of the rule nets 1300. This embodiment of the invention allows a whole digital rule processor to be configured in a desktop type system. In another embodiment of the invention, the rule nets 1300, slave translators 1200, global controller 300 and global bindery 400 can each be an application specific integrated circuit (ASIC) configured as shown in FIG. 5.

Figure 6:
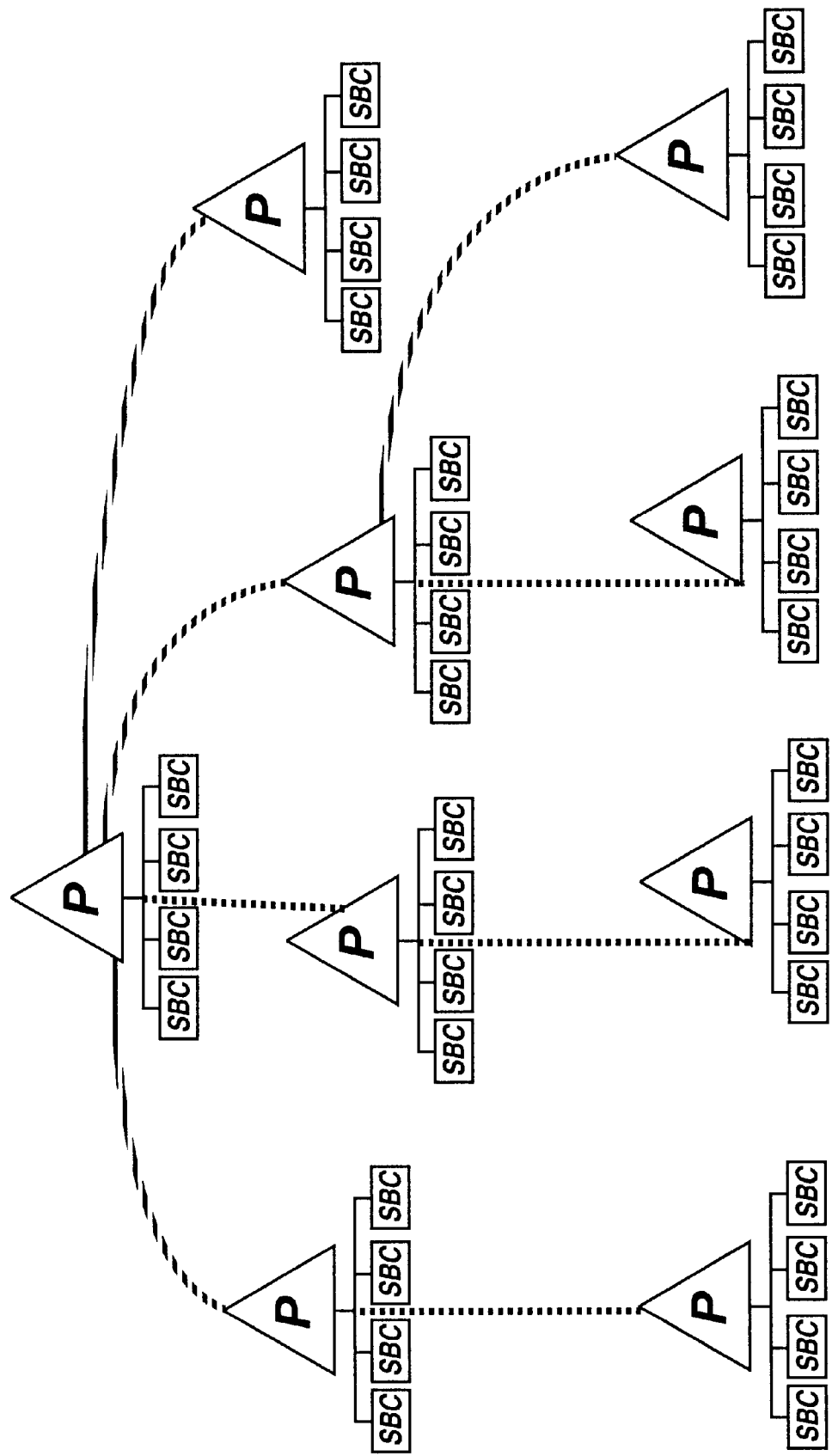
FIG. 6 shows a distributed digital processor with a hierarchy of connected global controllers.

FIG. 6 shows a logical representation of multiple digital rule processors connected in a hierarchical configuration. The digital rule processor, logically represented as P, is distributed across the single board computer (SBC) nodes. This embodiment allows global controllers to be connected to other global controllers to divide the rules from multiple applications compiled under this invention between subservient global controllers. This hierarchy allows simultaneous application processing to be performed and farmed out to global controllers lower in the hierarchy and yet the rules are executed in an orderly fashion without having to timeshare scarce resources such as the global queue and bus. The fact that rules from an application are distributed across many individual nodes is a major difference between systems using only von Neumann processors (serial computation devices), and the digital parallel controller device of the current invention. Furthermore, networking of an application is a natural byproduct of the global controller and rule net behavior, rather than a contrived emulation done in software.

It should be mentioned again that the distributed digital processor trades speed for reliability. The distributed nature of the rule processor is not as fast as direct von Neumann processing but it is very stable and will not become indeterminate or crash. To aid in efficient processing, the rules or application instructions in the current invention should be less granular than a program written for a von Neumann processor. The coarser the granularity of rules in the target application, the faster the performance of the current invention because the actual work is divided into its granular parts by the APIs which are called. Having a coarse level of granularity also allows the digital processor to send instructions from the same thread directly to the same slave translator without having to broadcast a general broadcast rule which can be accepted by any slave translator. The application programmer must use the high level source code to overcome the processing inefficiency of this invention.

This invention is more stable than von Neumann processing systems for a number of reasons. First, there is a separation between code and data. In a normal von Neumann machine, the code and data are in the same data storage area. In the current invention, the executing application's data is stored in the global controller and the rules (code) are stored in the read only rule nets. Second, there is no instruction pointer to be corrupted. A von Neuman machine which has a corrupted instruction pointer will go into an indeterminate state and crash. The current invention cannot crash because when one of the individual processing nodes crashes, the remaining rule net(s) will realize that the last rule it broadcast was not completed by the rule net or slave translator who accepted the rule and the remaining rule net will rebroadcast the timed out rule and processing will resume.

The third reason that the current invention is more stable than von Neumann systems is the redundancy of the system. All the elements of the invention are backed up on other individual nodes. For example, the global data of the application is backed up on many nodes and if one node crashes, the data has not been lost and the state of the network has been stored. As stated above, the rule or thread that crashed can resume because the broadcasting rule net or even a copy of the broadcasting rule net will realize that it did not complete and will rebroadcast its rule and the processing will continue.

A fourth reason that the current invention is more stable than von Neumann architectures alone is that the local bindery contains similarities to a stack in a von Neumann machine, but it is not corruptible, or able to overflow from improper stack variable usage. In addition the plurality of local binderies allows for true parallelism.

A final reason for the stability of the current invention is that the compiler generates slave calls to allocate a separate buffer from the global data memory pool which is divided up specifically for local variables. Even if the buffer is corrupted, it will not affect other buffers on other memory pages or affect the local bindery. So the invention cannot lose control because of corrupt data. In contrast, local variables in von Neumann functions are allocated on the stack which can be corrupted.

Now each element of the invention described above will be discussed in further detail, and the specific states, storage location names, parameters and data passed through the digital rule processor will be discussed.

The variable storage locations in the distributed digital processor contain three segments: 1) a variable number, 2) the variable value, and 3) the variable type. The actual lengths of the variable segments are determined based on the available transmission speeds in the system. If the variable segments are larger then the transmission time will be longer and if the segment size is smaller then the transmission will be shorter. The preferred sizes of the variable parts are 16 bits for the variable number and variable value and 8 bits for the variable type. The segment lengths could be longer or shorter depending on the actual implementation of the invention.

The variable type has three sub-segments which are included in the variable. The variable type is composed of 3 sub-segments: an Indirect Flag, an Input/Output Variable, and a Variable Buffer type. The Indirect Flag indicates that the buffer holds another buffer number and offset.

The Variable Buffer Type indicates the size of the indirect buffer. This table shows the states of the variable buffer type:

| Flag Name | Definition |
|---|---|
| BYTES1 | 1 byte |
| BYTES2 | 2 bytes |
| BYTES4 | 4 bytes |
| FLTPOINT | 16 bytes |
| STRBIG | 256 bytes |
| RECORDD | 1 byte/pointer to variable size |

The Output/Input variable has following 4 states as shown in the table below:

| State | Definition |
|---|---|
| Output | The variable is always output if the rule is recognized. |
| Input | The variable is always used to recognize a rule. |
| Store_Output | This is an output variable which flags the global controller to store the corresponding output variable in the broadcast rule on the global bindery as a parameter in the receiving local bindery. This assumes that the rule on the global bindery is a function call, with the output variables being parameters. Only rules in the rule nets, not broadcast rules, have this type of variable. |
| Output_to_Input | This is an output variable at recognition time which is converted by the global controller into an input variable on the global bindery at broadcast time. This permits function initiation and completion to work. Only rules in the rule nets have this variable. |

The Output_to_Input variable is essentially an output variable which is immediately converted by the global controller 300 into an input variable for the new rule being called.

Figure 7:
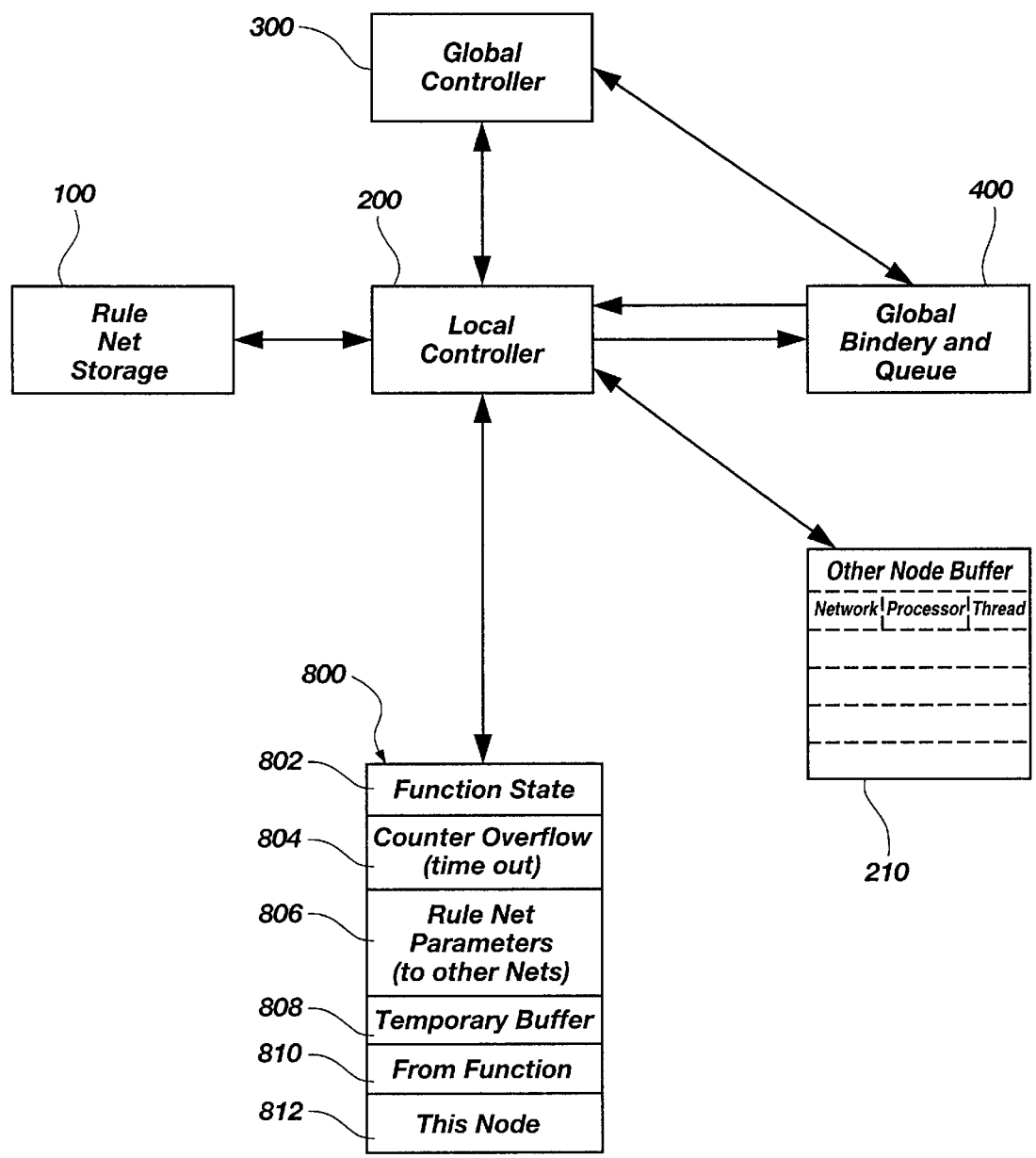
FIG. 7 shows a section of a distributed digital processor with a detailed view of the local controller and the Other Node Buffer

Referring to FIG. 7, each local controller 200 has a rule net storage 100, and the local controller 200 is coupled to the global controller 300, global bindery and queue 400 and has access to the local bindery 800 (or local binderies). The local controller has logic to recognize a broadcast rule from the global controller 300 and global bindery 400 against the rules in the rule net 100 storage. If the destination is outside the broadcasting node's physical chassis, data buffers from the global data memory pool will be copied along with the rule. The destination address for each source region is stored and retrieved from the Other Node Buffer 210. The Other Node Buffer is essentially a hash table for storing the To_Node and From_Node and Destination_Addr addresses. The hashing key for the Other Node Buffer is generated by an offset created from the source region (defined immediately below) and thread number. At any given time this table will be fairly sparse depending on the number of threads executing on a specific node.

At this point a source region number will be defined. Related functions are grouped together in a source code header (e.g. with a file with a .h suffix). These groups need to be recognized by the invention because they are related and will be sent to the same thread for processing. At compile time a table is generated which defines source region numbers of related function groups in the source headers.

In one embodiment of the invention, a specialized group of functions is designated which are the fundamental operations of an ALU as well as interfaces to I/O devices such as the keyboard, screen, disk files, mouse, serial ports, etc. All of the standard library functions such as string manipulation, file handling, floating point processing, etc. are also contained in this group. Variables stored in each rule net's local bindery, as well as the address mapping array, are in this group. It is possible to broadcast these fundamental operations across the bus or network communication device, but it is inefficient to send the fundamental operations across the network or bus. So, these fundamental operations are grouped together and recognized so they can be sent to the local von Neumann processor used by the local controller or slave local controller where the fundamental operation originated. Sending a fundamental operation to a von Neuman processor on the local chassis avoids the overhead of broadcasting it across the network and the processing associated with such a broadcast.

The local bindery 800 holds the status variables needed for: Function State 802, Counter Overflow 804, Rule Net Parameters 806, a Temporary Buffer 808, a From Function value 810, and a This Node buffer 812. Unlike a serial von Neumann processor which uses the instruction pointer as a state control for the code, a rule net requires a Function State variable to define which group of parallel rules may be recognized next. The address mapping array, known as the Other Node Buffer 210, is coupled to the local controller so the network chassis-processor-thread addresses are stored by thread-source code group in the address array. The thread number corresponds to a thread state stored in one of the local binderies. As the local controller 200 compares rules for different threads it switches between the copies of the local binderies corresponding to the thread. It should also be mentioned at this point that the slave translators have functionality and local bindery construction similar to a rule net, with the exception that a slave local controller can call slave functionality.

The Counter Overflow 802 is provided to limit the time a rule net should wait for a response to a digital rule it has broadcast for processing by another node. For example, an API call on a slave translator may fail to complete on time, and this counter sets a time limit after which the broadcasting rule net times out and either re-broadcasts the rule or enters an error recovery state. With potentially many rule nets asynchronously sending commands and receiving results, the potential for a failure may occur from time to time. This is especially true of a hardware failure in an I/O device (e.g. a disk drive). This Counter Overflow variable can be accessed for comparison to an internal clock and it can also be reset. It should also be mentioned that the Function State and Counter OverFlow are local variables only and never are broadcast through the global bindery 400.

When a rule net sends out a digital rule, there may be parameters which accompany the command. These parameters are stored in the Rule Net Parameters 806. When the local controller or slave translator recognizes that a call has been made to it, the parameters accompanying the call are saved in the Rule Net Parameters 806. Then the buffers supplied in the Rule Net Parameters 806 are used for further data manipulation. If the call came from another node or physical chassis, the data accompanying the rule is copied by the global controller 300 into the global data memory 301. Based on this disclosure it can be seen that the rule net parameters can be compared to parameters on a stack in a von Neumann machine.

Every rule net needs a work space to use as a stack for storage of temporary calculations and this work space is defined as the Temporary Buffer 808. When a rule net broadcasts a rule to a slave translator it tells the slave translator to use the Temporary Buffer 808 for storing the results of the broadcast rule. In order to optimize memory usage and not waste memory on idle rule net, which most will be at any given moment, permanent storage is not allocated to each rule net. The local controller 200 must allocate temporary memory at the start of each rule net execution, and free the memory at the end. The memory allocated depends on the storage requirements of rule net which is executing. The buffer handle number of the allocated temporary memory is stored in the Temporary Buffer register.

In a parallel digital rule processing environment any rule net can call another specific rule net. A race condition can occur where multiple nets call a specific net at the same time. This rule net must reply on the global bindery to acknowledge which caller rule net has won. The caller net number is stored in the From Function variable 810. Every rule broadcast in this invention has a From Function variable 810.

The Other Node Buffer 210 is the global array which stores the network chassis-processor node-thread number mapped by thread number and source region number. This array applies to all rule nets under the global controller and is essentially a listing of the address and source region of the calling rule net who created the specific threads in the local bindery. To_Node, From_Node, Destination_Addr variables in rule broadcasts use this array of addresses as a source or sink. When the Destination_Addr, To_Node, From_Node variables are used as a source, the local controller retrieves the data from the This_Node register (which is unique for each node) to determine the address of the current node (chassis and processor) so that it can be sent with the rule broadcast. When these variables are a sink they contain the return addresses for the rules. For example, in slave translators the return address must be stored for the API calls that the slave translator has running. If there are database, email, or other services supported for the slave translator as well as the basic arithmetic, string, buffer, file I/O calls, then the return addresses are stored in the Other Node Buffer. The thread number comes from the data portion of the variable in the Other Node Buffer array. The preferred method of finding the array offset hashing key) is by using a 5 bit thread, and an 11 bit include number. In its preferred embodiment the data in the array offset is 8 bits for the chassis number (node in the cluster, with 0 not used), 3 bits for the processor number (single board computer or main CPU on the motherboard, with 0 for the global controller), and 5 bits for the thread, which can be ORed (a logical union operation, hereafter ORed) with the 5 bit thread from the data portion of the variable making the access. Of course, the size of this array could be larger or smaller depending on the overall size of network and number of von Neumann processors used.

This_Node 812 can also be directly accessed by the global controller and is global to all rule nets and slave translators on a given physical chassis. It stores the current chassis-processor number. The This Node value is ORed with the particular thread number of the broadcast rule. The thread number comes from the data portion of the instance variable using this buffer. The preferred size of the thread data is 5 bits, and the group region is 11 bits. Again, the size of this value could be larger or smaller depending on the overall size of network and number of von Neumann processors used in each chassis.

Figure 8:
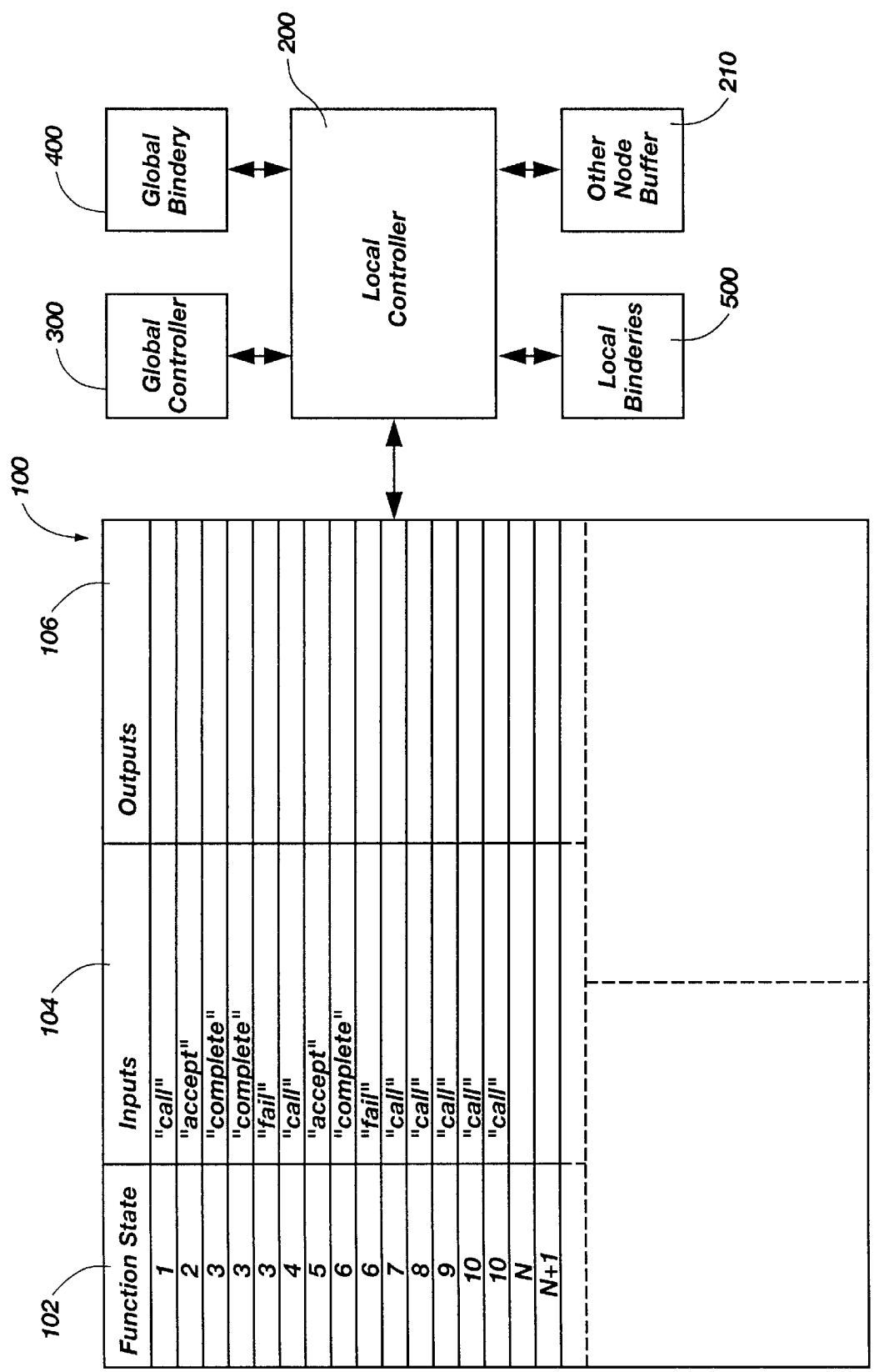
FIG. 8 shows a local controller and rule net in a distributed digital processor and a partially abstracted view of the organization of the rule net.

Referring now to FIG. 8, the detailed operation of the local controller 200 will be discussed. When a rule broadcast is received, each local controller 200 attempts to recognize a rule from the rule net 100 by using at least one input variable 104, at least one output variable to set the next state 106, and a Function State 102. The Function State 102 for each rule is generated by the compiler and is strictly increasing. Several digital rules stored in the rule nets can have the same Function State 102 value in order to handle parallelism. For example, all the rules are sequentially numbered from 1 to N, and parallel rules will have the same Function State 102. The Function State 102 variable is both an input and an output variable because each rule needs an input Function State to help match the current state and an output Function State to determine the next Function State.

There are two types of rules in this invention, one which is stored in a rule net storage area 100 and can be matched with incoming broadcast rules. The second is broadcast rules which can be broadcast over the bus through the global controller 300 and global bindery 400. Broadcast rules can be grouped into four categories. First, Call instances which tell another rule net or slave translator to do something. This can be compared to a function call in von Neumann assembly code. Each call may have parameters, as well as return chassis-processor-thread information. The call is recognized by a local controller via a rule stored in a rule net storage or on a slave translator which then commences a sequence of Accept and then Completion or Failure messages. In the case of a slave translator call, the call must first be Accepted. After the call is accepted then work is done on a von Neumann processor called by the slave translator, to calculate an arithmetic operation, or process a database action. For example, after the slave translator rule's work is complete a Complete or Failure rule is broadcast.

The second category of broadcast rules are Accept rules, as mentioned above. Accept rule instances are broadcast to acknowledge that the receiving rule net or slave translator will process the requested action. The rule net or slave translator receiving the Accept broadcast stores who accepted the requested call and the address to be stored in the Other Node Buffer is returned to the calling rule net. If the calling rule is a general broadcast to any node, not a specifically addressed call, then the return Accept's From_Node address will be saved in the Other Node Buffer at the index key number created by source region-thread so the address can be used by subsequent calls. The information regarding which rule net or slave translator accepted a call is very important because a rule net will then send all of the other rules which belong to that pre-defined source group and thread to the same slave translator to increase the throughput of the digital rule processing system. Whether or not a call is accepted by a rule net or slave translator will depend on the current processing load or hardware capability of the von Neumann processor(s) used by the slave translators or rule nets.

Completion instances are the third type of broadcast and are sent and recognized after the call has been processed and completed. Failure to successfully complete the task is also a completion. Often there is a return result in one of the parameters, or in the return value of the function.

The fourth potential broadcast rule is a Change of Execution instance. This type of instance will be broadcast when the compilation results in return statements, goto, else, and the internals of an if statement conditional, or for, while, or switch, case, break statements. These usually don't generate an external broadcast, but can be considered an internal broadcast within the rule net to change the internal state of the local controller and rule net. Because they are not broadcast, they do not contain From_Function, To_Node, From_Node, From_This_Node, To_This_Node, or Destination_Addr variables, which are contained in each of the other types of broadcast instances.

Figure 9:
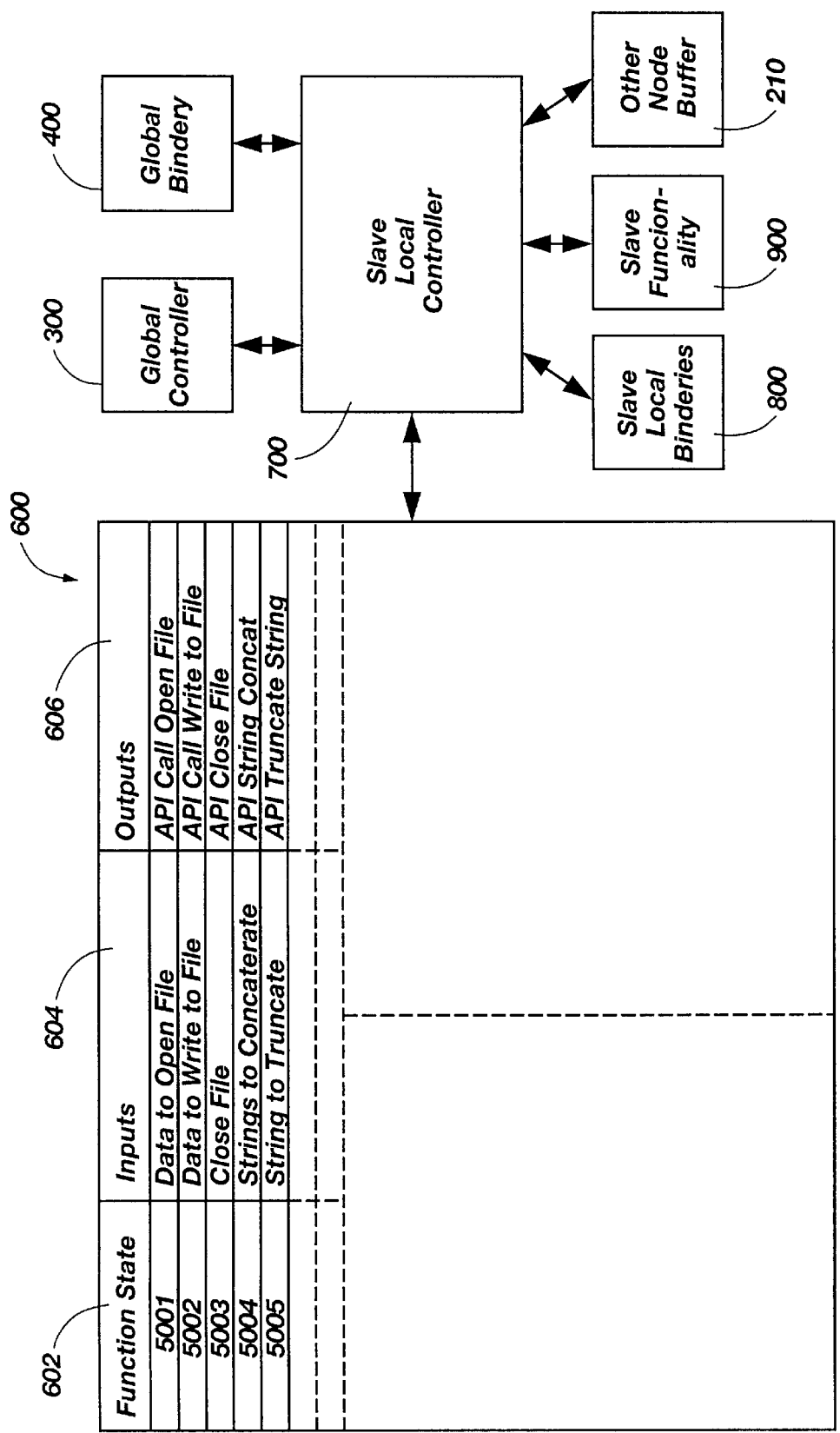
FIG. 9 shows a slave local controller and a slave translator in a distributed processor and a partially abstracted view of the organization of the slave translator.

Referring to FIG. 9, the slave translators and API's 606 are called by the rule nets and executed by the slave local controller 700 to call the slave functionality 900 and complete the actual work in this invention. In order to make as efficient use as possible of the slave functionality 900, each one has its own von Neumann processor with an ALU, local memory, and disk drive upon which resides its own version of an operating system. The slave functionality has a separate, asynchronous relationship with the slave translator, and may talk to other von Neumann processors if desired. Ideally, a von Neumann processor will accompany each I/O device, such as a network card or disk drive. One processor should do the graphical user interface for the screen, keyboard and mouse. The user interface processor should be the main central processing unit of a conventional personal computer (PC).

Four additional von Neumann processors is a reasonable number to use for I/O device control without overburdening the bus capacity. The preferred implementation of this invention is able to address 7 von Neumann processors per slave unit. 3 bits are used for addressing the processors and 0 is the global controller. The use of more than 7 processors in a chassis could easily be accommodated by increasing the size of the address space, which means that the Other Node Buffer element size would have to be greater than 16 bits.

The slave functionality 900 can normally be allocated to specifics tasks. For example, in processor intensive tasks, such as virtual reality systems, the von Neumann processors have no I/O interaction, but strictly process data and return the result. Another example is a disk drive processor which can take all the file object calls, etc, or the network card processor. If only one von Neumann processor accompanies a slave local controller 700 and slave functionality 900, then all the predefined slave objects that are not supported by the von Neumann processor will be unavailable. Any user defined objects can be broadcast over a network to other rule nets or slave translators on nodes in the cluster.

The broadcast cycle of the invention and the broadcast instances which are dispatched will now be discussed in further detail. The order in which the previously compiled rules should execute must be broadcast in order to actually execute the digital rules stored on the rule nets or slave translators. The Function State number of the first rule to be executed by the invention is stored in the global controller in an initial register and is broadcast to initiate the target application. This would be equivalent to the function call of main( ) in a C program.

Figure 10:
FIG. 10 is a view of one possible configuration of a digital rule stored in a rule net.

Because the invention is an asynchronous parallel machine several rule nets may recognize and broadcast rules. The global queue stores these rules. The rules are broadcast one at a time by the global bindery for all slave translators and rule nets to see and attempt to recognize. Once the broadcast rule and its parameters have been seen by all the rule nets and slave translators, the rule is discarded. Referring now to FIG. 10, if one of the rule nets or slave translators recognizes the Function State and the input variables 1400 of the broadcast instance, it stores the output variables 1500 from the broadcast and uses them as needed. Then each rule net can broadcast the rules for other rule nets or slave translators to recognize and execute. These broadcast rules are stored in the global queue. Each rule net can also buffer rules to be broadcast if the global queue is full and then broadcast the stored rules to the global queue later.

Referring again to FIG. 9, the slave translators can only recognize object calls. This call is denoted by a Function State 602 followed by the object number 604 which is an input variable. Then the called slave translator returns an Accept along with a From_Function number (caller function number). These are both input variables. This From_Function variable is necessary to guarantee that the correct caller rule net knows that the slave or rule net has accepted its net call in case more than one net calls this slave translator or rule net at the same time. All calls have a From_Function output variable which stores data identifying the rule net number. This variable is also used to identify where this call came from so when the return data or return state is complete it can be returned to the correct calling rule net. After generating an Accept, the slave translator will call the slave functionality 900 which we defined by the API outputs 606 of the slave translator rule.

All calls have a From_Node variable, of output type, which stores data identifying the thread number and the source region. This data is ORed with the This_Node buffer which can be seen globally in each local bindery. This_Node contains the chassis, and processor number (0 if it is the global controller), ORed with the thread number of the current net thread. If a rule is recognized by the recipient slave translator or rule net, the From_Node variable of type Store_Output, is stored in the Other Node Array (global address array). As described before, the hashing key for the entry in the Other Node Buffer is determined by the data of the recipient instance From_Node variable containing the thread and source region number. Basic arithmetic operations (+ −*/), string manipulations (strcpy, strcmp), memory and buffer calls (copybuff) and all basic I/O calls to the screen, disk, keyboard, mouse are from a pre-defined source region number (typically 0), and do not get broadcast outside of the chassis over the network as discussed earlier.

Some calls are made to all nodes in the network cluster in order to find one node-processor-thread which will process all of the high level API (application programmer interface) calls belonging to a particular source region. As described above, the source region is defined by APIs groups in source code headers during compilation. These source region groups typically belong to the same application or call related APIs such as database calls, or graphics calls. If the broadcast rule call is sent to a specific address destination, then the broadcast rule call also has an input variable To_Node with data which identifies the thread and source region. This data is used to get an offset into the Other Node Buffer (global address array). The thread is ORed with the chassis-processor from the Other Node Buffer array.

Broadcast calls also have output variables which are stored as parameters. Storage of the parameters occurs in order, so the compiler must enforce parameter type checking. In the called rule net or slave translator the entire variable is stored, including the variable number, value, and type, and the variables are stored in the local bindery parameter storage. These values are used in slave translators as buffer handle descriptors or constants.

When a rule call is made to a slave translator, data will be needed for that slave rule to execute. The global controller checks to see if the destination of the rule is outside the physical chassis, and if it is then data will be transferred with the broadcast rule. The preferred implementation of this transfer is done using a bus that is separate from the main bus. Transfer of data may be done by requiring that the rule net and local controller pre-load the data in temporary buffers connected to a secondary bus which connects all the nodes. This relieves the main bus from having to handle data which goes back to the global data memory, because once the slave object finishes processing, it returns the data to the global data memory. Using a duplicate bus helps reduce the data I/O bottleneck on the main bus. An example of a duplicate bus is shown in the case of clusters, such as those that use ServerNet, VIA or SCI cluster fabric for the alternate bus between cluster nodes, and not the Local Area Network. In the preferred embodiment, rule calls would also be made over the same high speed data path that the data is using. In an alternate embodiment of the invention where the entire invention is contained on one physical chassis, the bus could be PCI, ISA, EISA, or VME.

When a broadcast instance is accepted by a slave translator or another rule net, an Accept instance is echoed back. The data of the Accept rule includes the From_Net number, and its type is Input. If more than one acceptance message is sent, the first one received is saved, along with the return address of the rule net or slave translator which sent the acceptance. In specific destination calls, or calls to source region 0, the Accept may be omitted because the Complete will return fast enough that an Accept is not needed.

If the Accept is from a broadcast call to all nodes, there is a From_This_Node output variable with data from the This_Node buffer ORed with the thread from the data portion of the From_This_Node variable. This data identifies the accepting node to the broadcasting rule net. The Accept also has an output variable Destination_Addr with data from the Other Node Buffer array. This information identifies the thread and source region for any other calls for the same thread (i.e. similar database or graphics calls.) The thread and source region information are determined through the following process. The offset key into the array is determined by the thread and source region number data of Destination_Addr. The array value is ORed with the thread. The recognizing rule generated by this Accept has a From_Node variable of Store_Output type which will store the From_This_Node data into the Other Node Buffer array.

If the Accept is from a specific node call then the Accept instance already knew the destination and so it includes a To_This_Node input variable with data from the This_Node buffer. There is also a Destination_Addr output variable with data from the Other Node Buffer array, where the offset key is determined by the data of the Destination_Addr variable as a thread and source region array. The rule net receiving the Accept rule has a To_Node input variable which compares the data to its Other Node Buffer array ORed with the thread number from the data portion of the variable (the array offset is determined by the data portion of the TO_NODE variable). This insures that the correct thread is being called.

Once a broadcast rule call has been made, and while the rule net which sent the call is waiting for the Accept rule instance to come back, a timer is reset in the calling rule net with a Reset_Counter output variable. The calling rule net has another variable waiting at the same Function State as the Accept rule instance. It has a Counter_Overflow input variable. The variable contains the number of thousands of a second to wait before it times out. If that number of seconds is exceeded without an Accept call, then the Function State is reset to issue the call again. If the overflow is triggered a set number of times without getting past this Function State, the Function State is set to the Error_Exit level. At the Error_Exit Function State there may be an error handling routine for the rule net. Even if there is no error handling routine this error handling rule will be called in the rule net if the Counter_Overflow times out the set number of times. This means that error handling is an inherent characteristic of this fault tolerant, highly available computing system.

Once the slave translator has finished processing, it returns a Complete status, or Failed status. In the case of the parallel call, no finished status is expected, because the caller continues processing once the Accept status is received. Every completed call, whether it succeeds or fails, has a To_This_Node input variable using the data from This_Node global buffer ORed with the thread number. There is also a Destination_Addr output variable using an offset from the Other Node Buffer array, ORed with the thread number. The offset into the array comes from the data portion of the variable, consisting of the thread and include source region number. The recognizing rule for the Complete or Failure has a To_Node input variable which is compared with the data from an offset in the Other Node Buffer array, ORed with the thread number. The offset into the array comes from the thread and include group number in the data portion of the To_Node variable. These steps guarantee that the Complete matches up with the correct calling thread.

As part of the Call-Accept-Complete cycle, there is a Counter Reset output variable in the Accept call which is recognized. This starts the counter waiting for a Complete or Fail rule broadcast. If the counter overflow is recognized before the Complete or Fail message, the Function State is reset to the calling instance. This is done a pre-set number of times, after which the net control logic sets the Function State to Error_Exit.

In summary, there are two potential points of timeout failure in most call broadcast sequences: 1) while waiting for the Accept instance, and 2) while waiting for the Complete or Failure instance. In the case of predefined calls to a local slave von Neumann functions, the Accept part of the sequence can be omitted, and the calling sequence would simply wait for a Complete or Fail. Omitting the Accept on a network call is possible but would require a lengthy timeout for the Complete, which creates a problem for retrying broadcasts because they would take an inordinately long time period.

The following tables summarize the Call-Accept-Complete cycle. This first table summarizes the variables sent in a general broadcast cycle and is not addressed to a specific rule net or slave translator on a specific rule net.

| Originator Node | | Recipient Node |
| --- | --- | --- |
| 1. General Broadcast Call. Broadcast sent with a From_This_Node variable of Output type with data loaded from the This_Node buffer. | → | Call Recognized. The From_Node is stored in the Other_Node_Buffer because it is of Store_Output type. |
| 2. Accept Received. The From_Node is stored in the Other_Node_Buffer because it is of Store_Output type | ← | Accept Sent. Broadcast sent with a From_This_Node of Output type containing data from This_Node, and Destination_Addr of Output type is sent with data from the Other_Node_Buffer |
| 3. Receive Complete. Broadcast contains a To_Node of Input type which came from "recipient node" Other_Node_Buffer. | ← | Compete or Failure Sent. Broadcast sent with To_This_Node of Input type using data from This_Node of Input type using data from This_Node and the Destination_Addr is Output type sent with data from the Other_Node_Buffer |

The next table shows a rule broadcast cycle which is directed to a specific node and address.

| Originator Node | Recipient Node |
|---|---|
| 1. Call With No Broadcast. Broadcast sent with a From_This_Node variable of Output type with data loaded from the This_Node buffer. To_Node variable of Input type with data from the Other_Node_Buffer. No Destination_Addr needed. | Call Recognized. Broadcast contains From_Node which is stored in the Other_Node_Buffer because it is of Store_Output type. To_This_Node of Input type is compared to recipient's own This_Node. |
| 2. Accept Received. Broadcast contains To_Node of Input type which is compared to the Other_Node_Buffer. | Accept Sent. Broadcast sent with a From_This_Node as Output type containing data from This_Node. Destination_Addr of Output type is sent with data from the Other_Node_Buffer |
| 3. Receive Complete. Broadcast contains a To_Node as Input type which came from "recipient nodes" Other_Node_Buffer. | Compete or Failure Sent. Broadcast sent with To_This_Node as Input type using data from This_Node. The Destination_Addr of Output type is sent with data from the Other_Node_Buffer. |

Each rule net has an error exit state arbitrarily defined near the highest Function State (or rule number). Rule net exit and return normally occurs before this state is reached or called. The Error_Exit can be used to clean up temporary data, set error condition flags in global buffers, closing files, releasing memory, and other error handing routines.

Every rule net and slave translator has a beginning rule which is checked to allow it to recognize that it has been called. All the parameters from the call are stored in the local bindery of the rule net via a group of Store_Output variables in the rule. In the preferred embodiment, a maximum of 5 parameters is passed, but the number of parameters which could be passed is theoretically unbounded. Using a limited number of parameters forces some calls to combine parameters into structures (records), which records get passed as pointers. The return variable of a rule call is also a buffer on the temporary buffer space of a rule net.

It should be mentioned at this point that the preferred embodiment of the Function State numbering system is designed for a 16 bit Function State scheme, starting at 0 for the first rule in every rule net. Larger Function State numbering values could be used by providing more bits, but a rule net larger than the number of rule instances which could fill a 16 bit numbering scheme would reduce the speed of the system. Keep in mind that many of the instances generated have the same Function State (such as the Counter Overflow, Complete and Failure rules, or the Accept and Overflow rules), so that a count of 65535 Function States will have at least 120000 instances in the rule net.

Now, the network addressing between the global controller, global bindery, rule nets and slave translators will be discussed. There are 2 ways that rules are broadcast. The first is a generally broadcast rule which does not know where it will be received until it has received an Accept back from a rule net or slave translator. The second is the broadcast of a rule with a specific node address is intended for a particular chassis (same chassis for predefined objects), a processor, and a thread. These directly addressed rule types are broadcast after a thread of execution has been previously set up in a rule net or slave translator. The global bindery which stores the network addressing can be extended to encompass a Local Area Network (LAN) or a Wide Area Network (WAN) with larger timeout tolerances. As the size and delay of the network grows, a longer Counter Overflow must be provided to allow for the propagation delay.

Unlike von Neumann processors, which are serial devices, the inherent nature of the distributed digital rule processor is a parallel network. In order to not broadcast all instances onto the LAN, a filter can be used to select only those instances which are known to need a larger sphere of communication. The use of the TO_NODE and DESTINATION variables accomplishes this.

It is also important to note that a broadcast rule is truly a network message, not a serial emulation of network Remote Procedure Calls. A rule net does not care who accepts a rule broadcast, only that the response happens in a timely fashion. This networking permits large Wide Area Networks using satellites and terrestrial links. To the global controllers which may be organized in a hierarchical scheme, this networking appears as one large net, not as separate nets.

The distributed digital rule processor is a different, yet complementary approach to von Neumann processing. A global controller and global bindery enhances the high availability of a cluster of nodes by broadcasting messages to rule nets and slave translators on nodes, and von Neumann processors in each node, so that multiple instantiations of slave translators can provide responses to rule net calls. The distributed digital rule processor is scalable because a hierarchy of global controllers and global binderies (each with at least one von Neumann processor) can be assembled, allowing very large clusters with hundreds of slave von Neumann processors in hundreds of network nodes to interact and be centrally controlled.

Pseudo Code Description of Broadcast Cycle

The following listing is a pseudo code listing in table form of a chain of rule calls between an originator and a recipient node such as a rule call cycle between 2 rule nets or a rule net and a slave translator. The first set is a broadcast type of rule, and the second set is the specific addressing, where a specific address is used to communicate with a rule net or slave translator. The Funct_State values P and P2 represent arbitrary starting points in the rule nets or slave translators which could be 1 or any other relative starting point.

1. Broadcast Type

| Originator Node-Call | | | Recipient Node-Recognize | | |
|---|---|---|---|---|---|
| Variable name | Variable Value | Variable Type | Variable name | Variable Value | Variable Type |
| Funct_State | P | Input | Funct_State | P2 | Input |
| Call_Funct | Rule Net # | Output_to_Input | Call_Funct | Rule Net # | Input |
| From_Funct | Calling Net # | Output → | From_Funct | Calling Net # | Store_Output |
| Reset_ | 0 | Output | | | |
| Temp_Buff or 1-5 parameters | offset into parameters | Output | Temp_Buff or 1-5 parameters | offset into parameters | Store_Output |
| From_This_Node | This_Node | Output | From_This_Node | This_Node | Output |
| Funct_State | P + 1 | Output | Funct_State | P2 + 1 | Output |

During the function call recognition Output_to_Input types become input type variables. Then the originator node goes into a wait state as shown next. The wait state will wait for a certain amount of time and then time out. It will do that a preselected number of times before it fail (preferably 3 times).

Originator Node-Wait

| Variable Name | Variable Value | Variable Type | |
|---|---|---|---|
| Funct_State | P + 1 | Input | ←Clock |
| Counter_Overflow | delay_value | Input | |
| Funct_State | P | Output | |

Hopefully the Originator will receive an acknowledge broadcast at the same Function State level before the wait rule times out.

Originator Node Recognize Accept / Recipient Node Accept

| Variable name | Variable Value | Variable Type | | Variable name | Variable Value | Variable Type |
|---|---|---|---|---|---|---|
| Funct_State | P + 1 | Input | | Funct_State | P2 + 1 | Input |
| Call_Funct | Rule Net # | Input | | Call_Funct | Rule Net # | Output_to_Input |
| From_Funct | Calling Net # | Input | ← | From_Funct | From_Funct_Buff | Output_to_Input |
| From_Node | Other_Node_Buff | Store_Output | | From_Thid_Node | This_Node | Output |
| Reset_Counter | 0 | Output | | Destination_Addr | Other_Node_Buff | Output |
| Funct_State | P + 1 | Output | | Funct_State | P2 + 2 | Output |

If Parallel then stop and start another call

Originator Node-Wait

| Variable Name | Variable Value | Variable Type | |
|---|---|---|---|
| Funct_State | P + 2 | Input | ←Clock |
| Counter_Overflow | delay_value | Input | |
| Funct_State | P | Output | |

If there is a destination buffer

Originator Node Complete with Data Transfer / Recipient Node

| Variable Name | Variable Value | Variable Type | | Variable Name | Variable Value | Variable Type |
|---|---|---|---|---|---|---|
| Funct_State | P + 2 | Input | | Funct_State | P2 | Input |
| Funct_CmpSuc | Rule Net # | Input | ← | Funct_CmpSuc | Called Net # | Output_to_Input |
| To_Node | Other_Node_Buff | Input | | To_This_Node | This_Node | Output_to_Input |
| dest_buffer | 0 | Store_Output | | Destination_Addr | Other_Node_Buff | Output |
| Funct_State | P + 3 | Output | | Funct_State | P2 + 1 | Output | else if it is a complete with no data transfer

Originator Node-Recognize Complete with no data / Recipient Node-Broadcast complete with no data

| Variable name | Variable Value | Variable Type | | Variable name | Variable Value | Variable Type |
|---|---|---|---|---|---|---|
| Funct_State | P + 2 | Input | | Funct_State | P2 | Input |
| Funct_CmpSuc | Rule Net # | Input | | Call_CmpSuc | Originator Net # | Output_to_Input |
| To_Node | Other_Node_Buff | Input | ← | To_This_Node | This_Node | Output_to_Input |
| | | | | Destination_Addr | Other_Node_Buff | Output |
| Funct_State | P + 3 | Output | | Funct_State | P2 + 1 | Output | else if the call failed and the recipient has not crashed or terminated then

Originator Node Recognize fail / Recipient Node Broadcast fail

| Variable name | Variable Value | Variable Type | | Variable name | Variable Value | Variable Type |
|---|---|---|---|---|---|---|
| Funct_State | P + 2 | Input | | Funct_State | P2 | Input |
| Funct_CmpFail | Rule Net # | Input | | Call_CmpFail | Originator Net # | Output_to_Input |
| To_Node | Other_Node_Buff | Input | ← | To_This_Node | This_Node | Output_to_Input |
| | | | | Destination_Addr | Other_Node_Buff | Output |
| Funct_State | P = Fail value | Output | | Funct_State | P2 + 1 | Output |

2. Specific Address Type of Broadcasts

| Originator Node-Call | | | Recipient Node-Recognize | | |
|---|---|---|---|---|---|
| Variable name | Variable Value | Variable Type | Variable name | Variable Value | Variable Type |
| Funct_State | P | Input | Funct_State | P2 | Input |
| Call_Funct | Rule Net # | Output_to_Input | Call_Funct | Rule Net # | Input |
| To_Node | This_Node | Output_to_Input → | To_This_Node | This_Node | Input |
| From_Funct | Calling Net # | Output | From_Funct Buff | Calling Net # | Store_Output |
| Temp_Buff or 1-5 parameters | offset into parameters | Output and indirect flag | Temp_Buff or 1-5 parameters | offset into parameters | Store_Output |
| From_This_Node | This_Node | Output | From_Node | Other_Node_Buff | Output |
| Funct_State | P + 1 | Output | Funct_State | P2 + 1 | Output |

Again on recognition all the Output_to_Input type variables become Input variables. The originator node will then wait for its timeout cycles (at least 3).

| Originator Node-Wait | | |
|---|---|---|
| Variable Name | Variable Value | Variable Type |
| Funct_State | P + 1 | Input ←Clock |
| Counter_Overflow | delay_value | Input |
| Funct_State | P1 | Output |

Hopefully the Originator will receive an Accept broadcast for the node it was specifically addressing at the same Function State level before the wait rule times out.

| Originator Node Recognize Accept | | | Recipient Node Accept | | |
|---|---|---|---|---|---|
| Variable name | Variable Value | Variable Type | Variable name | Variable Value | Variable Type |
| Funct_State | P + 1 | Input | Funct_State | P2 + 1 | Input |
| Funct_Accept | Rule Net # | Input | Funct_Accept | Rule Net # | Output_to_Input |
| To_Node | Other_Node_Buff | Input ← | To_This_Node | This_Node | Output_to_Input |
| From_Funct | Calling Net # | Input | From_Funct | From_Funct_Buff | Output_to_Input |
| Reset_Counter | 0 | Output | Destin-ation_Addr | Other_Node_Buff | Output |
| Funct_State | P + 2 | Output | Funct_State | P2 + 2 | Output |

If Parallel then stop and start another call

| Originator Node-Wait | | | |
|---|---|---|---|
| Variable Name | Variable Value | Variable Type | |
| Funct_State | P + 2 | Input | ←Clock |
| Counter_Overflow | delay_value | Input | |
| Funct_State | P | Output | |

If there is a destination buffer

| Originator Node Complete with Data Transfer | | | Recipient Node | | |
|---|---|---|---|---|---|
| Variable Name | Variable Value | Variable Type | Variable Name | Variable Value | Variable Type |
| Funct_State | P + 2 | Input | Funct_State | P2 | Input |
| Funct_CmpSuc | Rule Net # | Input ← | Funct_CmpSuc | Called Net # | Output_to_Input |
| To_Node | Other_Node_Buff | Input | To_This_Node | This_Node | Output_to_Input |
| dest_buffer | 0 | Store_Output | Destin-ation_Addr | Other_Node_Buff | Output |
| Funct_State | P + 3 | Output | Funct_State | P2 + 1 | Output | else if it is a complete with no data transfer

| Originator Node-Recognize Complete with no data | | | Recipient Node-Broadcast complete with no data | | |
|---|---|---|---|---|---|
| Variable name | Variable Value | Variable Type | Variable name | Variable Value | Variable Type |
| Funct_State | P + 2 | Input | Funct_State | P2 | Input |
| Funct_CmpSuc | Rule Net # | Input ← | Call_CmpSuc | Originator Net # | Output_to_Input |
| To_Node | Other_Node_Buff | Input | To_This_Node | This_Node | Output_to_Input |
| | | | Destin-ation_Addr | Other_Node_Buff | Output |
| Funct_State | P + 3 | Output | Funct_State | P2 + 1 | Output | else if the call failed and the recipient has not crashed or terminated then

| Originator Node Recognize fail | | | Recipient Node Broadcast fail | | |
|---|---|---|---|---|---|
| Variable name | Variable Value | Variable Type | Variable name | Variable Value | Variable Type |
| Funct_State | P + 2 | Input | Funct_State | P2 | Input |

-continued

| Originator Node Recognize fail | | | Recipient Node Broadcast fail | | |
|---|---|---|---|---|---|
| Variable name | Variable Value | Variable Type | Variable name | Variable Value | Variable Type |
| Funct_CmpFail | Rule Net # | Input | ← Call_CmpFail | Originator Net # | Output_to_Input |
| To_Node | Other_Node_Buff | Input | To_This_Node | This_Node | Output_to_Input |
| | | | Destination_Addr | Other_Node_Buff | Output |
| Funct_State | P = Fail value | Output | Funct_State | P2 + 1 | Output |

General Rule Examples

The following examples are of rules in a rule net or broadcast rules. In the example rule instances, all of the numbers are in hexadecimal and use the data structure code directly following the example rules. Each instance has a byte stating total number of variables and the number of input variables. It should be noted that although the variable name and type are shown in the tables, the variable values and variable type are only stored as numerical representations in an order which is known to the local and global controllers and which are pre-defined in the compiler. Some of the defined variables and function calls are shown in the data structures following the example rules.

This instance shows 5 total variables and 2 input variables. This call does not have a TO_NODE input variable, so it is a broadcast style to find a recipient slave translator or rule net to use for all subsequent calls.

| Variable Name | Variable Type | Value | Description |
|---|---|---|---|
| Funct_State | Input | 0 | Function State activity is on the local bindery only. |
| Call_Funct | Input | 3001 | Call rule net 3001. (i.e., rule 3001) |
| From_Funct_Buff | Output | 0 | Stores the calling rule net number. |
| From_This_Node | Output | (2<<11)\|D002 | Output which tells the accepting rule net that the thread is 2 (shifted over 11 bits to fit in a 16 bit word) and that the group is D002. The groups are compiler predefined to correspond to API groups. |
| Funct_State | Output | 1 | Stores the next function state |

This is an example of a rule stored in the rule net. It has 6 total variables and 1 input variable. When the function state is recognized and the instance is put on the bindery, the Output_to_Input variables become Input variables for recognition in the other rule net's set of rule instances.

| Variable Name | Variable Type | Value | Description |
|---|---|---|---|
| Funct_State | Input | 1 | Function State is 1. |
| Funct_Accept | Output_to_Input | 3001 | Function Accept 3001 becomes an input variable on the bindery when broadcast. |
| From_Funct: | Output_to_Input | 0 | From Function whatever is in the From Function Buffer (2FFD) in the local bindery. This output variable on the bindery broadcast. |
| From_Funct_Buff | | | |
| From_This_Node | Output | (2<<11)\|D002 | Tell the accepting rule net what thread (2 shifted 11 bits) and what source code group (D002 from include file prototype) this function Accept comes from. |
| Destination_Addr | Output | (2<<11)\|D002 | Instructs the network where to directly send this instance, so that it doesn't have to be generally broadcast the accepted by a rule or slave controller. |
| Funct_State | Output | 2 | Next Function State is 2. |

This example rule instance is recognized in the set of rule net instances, and is broadcast to the local chassis only. This digital rule has 7 total variables and 1 input variable. Again note that the Output_to_Input Variable instances become Input variable instances when broadcast.

| Variable Name | Variable Type | Value | Description |
|---|---|---|---|
| Funct_State | Input | 4 | The Function State is 4. |
| Call_Funct | Output_to_Input | 850B | This is a Get Buffer call to allocate the memory needed for intermediate calculations. It becomes an Input variable when it is broadcast on the global bindery. |
| To_Node | Output_to_Input | 0 | Stores the calling net (function) number. |
| From_Funct | Output | 3001 | This function was called from function 3001. |
| 3 | Output | | Parameter to the Get Buffer Call. The number 3 denotes String Buffer of 256 bytes. |
| Reset_Counter | Output | 0 | Reset the timeout counter |
| From_This_Node | Output | (3<<11)\|0 | Tell the local controller where to send this rule instance. Local chassis only. |
| Funct_State | Output | 5 | The next Function State is 5 |

An example of a rule instance with 3 total variables and 2 input variables.

| Variable Name | Variable Type | Value | Description |
|---|---|---|---|
| Funct_State | Input | 5 | Function State 5. |
| Counter_Ovrfl | Input | 3E8 | Overflow with a time out a 1000 milliseconds. |

-continued

| Variable Name | Variable Type | Value | Description |
|---|---|---|---|
| Funct_State | Output | 4 | The next Function State is 4. This is a loop back to broadcast the function call again. This will happen only so many times, then go to F800, which is the error exit. This entire rule has no global bindery broadcasting. |

An example of a rule instance with 6 total variables and 4 input variables.

| Variable Name | Variable Type | Value | Description |
|---|---|---|---|
| Funct_State | Input | 3 | Function State 3. |
| Funct_Accept | Input | 850B | The Function Accept Get Buffer which waits for the accept instance. |
| To_Node | Input | (3<<11)\|D011 | This is an input to tell the receiving rule net or slave translator which processor and thread should accept the call. |
| From_Funct | Input | 3001 | This variable ensures that another instance isn't the one getting the 850B call. |
| Reset_Counter | Output | 0 | Output to reset the timeout counter in the rule net to wait for a Complete or Failure instance. |
| Funct_State | Output | 6 | The next Function State is 6 |

An example of a rule instance with 5 total variables and 3 input variables.

| Variable Name | Variable Type | Value | Description |
|---|---|---|---|
| Funct_State | Input | 6 | Function State 6. |
| Funct_Cmpsuc | Input | 850B | Successful completion of Get Buffer. |
| To_Node | Input | (3<<11)\|0 | This selects the correct return rule net. |
| 2FFE | Output Parameter | 0 | Stores the return buffer handle number in the temporary location on the local bindery. |
| Funct_State | Output | 7 | The next Function State is 7 |

An example of a rule instance with 3 total variables and 2 input variables.

| Variable Name | Variable Type | Value | Description |
|---|---|---|---|
| Funct_State | Input | 4 | Function State 4. |
| Funct_Cmpfail | Input | 850B | Failed completion of Get Buffer. |
| To_Node | Input | (3<<11)\|0 | This selects the correct return rule net. |

-continued

| Variable Name | Variable Type | Value | Description |
|---|---|---|---|
| Funct_State | Output | F800 | Function State Error Exit (i.e., the highest function state are error states). |

Now a list of defined variables and data structures is included to help explain the structure of the rules in the distributed digital processor shown immediately above.

```
#define INPUT                0
#define OUTPUT_TO_INPUT      32
#define OUTPUT               16
#define STORE_OUTPUT         48
typedef struct{
    unsigned name_:       /* value of 0 means empty */
    unsigned val:         /* mutual exclusion subclasses */
    unsigned char type:   /* flag or SOLO .DUO .LINENUMBER */
}VARIAB:                           // 5 bytes
typedef struct inss{               /* 59 Bytes */
    VARIAB vars[MAXVARS]:
    unsigned char num_ttl:
    unsigned char num_inputs:
    unsigned theprior:
}NODEE:
/* this is for the buffer type object, which has no other inputs */
#define BYTE4        (1)
#define FLTSLSH      (2)
#define STRBUFF      (3)
#define BYTE4K       (4)
#define BYTE64K      (5)
#define BYTE1        (6)
#define BYTE2        (7)
#define RECORDD      (8)
#define NOINDIR      (0)
#define POINT4       (64)
#define POINTERR     (128)
#define STRBIG       (3)
#define NOVARR       (0)
#define INDIRECT     (192)
#define OUTINN       (48)
#define BYTE4G       (7)
#define BYTES2       (4)
#define BYTES1       (5)
#define BYTES4       (6)
/* the type byte for VARIAB's in instances has the following composition
7     6      |   5     4     |    3     |   2    1    0
Indirect     |   OUT   IN    |          |   BYTE4 or larger
POINT4       |   INPUT       |          |   NOVARR
POINTER      |   FAKE_OUTPUT |          |   BYTE4
NOINDIR      |   OUTPUT      |          |   FLTSLSH
             |   STORE_OUTPUT|          |   STRBIG
             |               |          |   BYTES2
             |               |          |   BYTES1
             |               |          |   BYTES4 typedef struct{
    VARIAB Glob_bind[ TEMPLEVELS + 1][ MAX_BIND ]:
    short in_count[ TEMPLEVELS + 1 ]:   // number of input variables
                                        // in each bindery
    short ttl_count[ TEMPLEVELS + 1 ]:  // number of total variables
                                        // in each
    short TemLevel;
    short global_match. bump_count. num_processors:
    unsigned char proc_see. all_procs:
    BOOl want_data:
}GLOB_BINDERY:              // 410 BYTES
struct other_node{
    unsigned short thread_n   : 5:    // least significant
    unsigned short node_n     : 3:
    unsigned short chassis_n  : 8:
}:
// 1-14-98
// the 5 bit thread and 11 bit group = 16 bits.
struct val_overlay}
```

-continued

```
    unsigned short tread_v   : 5;    // least significant
    unsigned short group_v   : 11;
};
// start and end are accompanied by a number
END_FOR_START_INDENT  0x8600
START_INDENT          0x8601
END_INDENT            0x8602
LABEL_MARK            0x8603
COMMENT_MARK          0x8604
ERROR_EXIT            0x8606
IF_START              0x8607
WHILE_START           0x8608
GOTO_MARK             0x8609
BREAK_MARK            0x860A
CONTINUE_MARK         0x860B
ELSE_MARK             0X860C
FOR_MARK              0X860D
DO_MARK               0X860E
ASSIGN_               0X860F
ADDRESS_              0X8612
OPEN_ROUND            0X8613
CLOSE_ROUND           0X8614
GRTR_THAN             0X8615
EQL_TO                0X8616
LESS_THAN             0X8617
GRTR_EQL              0X8618
LESS_EQL              0X8619
NOT_BOOL              0X861A
NOT_EQL               0X861B
NEGATE_               0X861C
ADD_VAL               0X861D
SUB_VAL               0X861E
DIVIDE_VAL            0X861F
TIMES_VAL             0X8620
POWER_VAL             0X8621
END_STMT              0X8622
RETURN_               0X8623
SIZEOF_STMT           0X8624
SWITCH_STMT           0X8625
CASE_STMT             0X8626
DEFAULT_STMT          0X8627
INCR_OPR              0X8628
DECR_OPR              0X8629
PRIORITY_STMT         0X862A
FIELD_MARK            0X862B
REC_INDIRECT          0X862C
OPEN_BRACKET          0X862D
CLOSE_BRACKET         0X862E
COMMA_MARK            0X862F
OR_OPR                0x8630
AND_OPR               0x8631
DELAY_VAL             0x8632
PARALLEL_STMT         0X8633
EXIT_STMT             0X8634
WAIT_STMT             0X8635
RESET_COUNTER         0XAF01
COUNTER_OVRFL         0XAF02
FUNCT_ACCEPT          0XAF03
FUNCT_CMPSUC          0XAF04
FUNCT_CMPFAIL         0XAF05
FROM_FUNCT            0XAF06
CALL_FUNCT            0XAF07
END_CALL              0XAF08
FROM_NODE             0XAF09
TO_NODE               0XAF0A
TO_THIS_NODE          0XAF0B
DESTINATION_ADDR      0XAF0C
FUNCT_STATE           0XAF0D
FROM_THIS_NODE        0XAF0E
FROM_FUNCT.BUFF       0X2FFD
TEMP_BUFF             0X2FFE
REC_OBJ               0XB000
FLD_OBJ               0XB001
NET_OBJ               0XB006
LABEL_OBJ             0XB007
NUMBER_OBJ            0XB00B
PARAM_OBJ1            0XB010
PARAM_OBJ2            0XB011
PARAM_OBJ3            0XB012
PARAM_OBJ4            0XB013
PARAM_OBJ5            0XB014
OPENFILE              0X7000
OPENDB                0X7001
CLOSEFILE             0X7002
CLOSEDB               0X7003
READRECORD            0X7004
LOCKRECORD            0X7005
WRITERECORD           0X7006
READINDEX             0X7007
ADDRECORD             0X700B
DELETERECORD          0X7009
NEXTINDEX             0X700A
PREVINDEX             0X700B
BEGININDEX            0X700C
ENDINDEX              0X700D
FINDFILE              0X700E
NEXTFILE              0X700F
SEEKFILE              0X7010
READFILE              0X7011
WRITEFILE             0X7012
LOCKFILE              0X7013
SIZEWINDOW            0X7100
SHOWINDOW             0X7101
LOADFIELD             0X7102
WINDOWAPI             0X7104
SETSEL                0X7105
ENABLEFIELD           0X7106
SHOWFIELD             0X7107
GETTEXT               0X7108
SETTEXT               0X7109
GETFIELD              0X710A
GETKEY                0X8000
GETMOUSE              0X8001
OPENPRINT             0X8200
CLOSEPRINT            0X8201
SETPRINT              0X8202
OUTPRINT              0X8203
OPENPORT              0X8300
PORTPARMS             0X8301
CLOSEPORT             0X8302
SENDBLOCK             0X8303
GETBLOCK              0X8304
SNDBREAK              0X8305
WAITTIME              0X8306
MULTIMED              0X8400
COPYBUFF              0X8500
SETBUFF               0X8501
CLEARBUFF             0X8502
COPYFIELD             0X8503
STRTOFLTSLSH          0X8504
STRTOINT              0X8505
INTTOSTR              0X8506
FLTSLSHTOSTR          0X8507
STRCHR                0X8508
STRSTR                0X8509
STRCAT                0X850A
GETBUFF               0X850B
FREEBUFF              0X850C
COPYIMMED             0X850D
COMPAREIMMED          0X850E
FLTSLSHTOINT          0X850F
INTTOFLTSLSH          0X8510
GETFIELDOFF           0X8511
GETBUFFER             0X8512
COPYADDR              0X8513
COPYBUFFER            0X8514
GETFIELDOFF2          0X8515
STRCPY                0X8516
STRLEN                0X8517
COMPARESWITCH         0X8518
```

Pseudo Code Examples

This section is a pseudo code walk through of the execution of the current invention.

1. Once the digital rules for one or more rule nets are loaded into the DRAM of the rule nets, the global controller generates a main net number or the first function call broadcast onto the global bindery. This will be recognized by the main rule net and then other rule broadcasts will follow.

2. Each rule net receives the broadcast rules and checks to see if it has the rule and should accept the rule. All the rules for a single rule net are stored in Function State order. Thus the local controller of the engine only has to look at a small sequence of rules which match the Function State variable in the local net storage. Other rules in the rule net can be ignored until the Function State matches their first input variable, and the first variable is always the Function State. This economy of comparison allows one local controller to monitor several rule nets' digital rule instances very quickly, if desired.

3. If the local controller of a rule net finds a matching Function State, it proceeds to the next input variable, if available. If it is another local variable, such as the Overflow timer, it is compared also. A rule only matches if the Function State and all the input variables match.

4. If the input variable is a global bindery variable, then the local controller goes out to the global bindery to see if any of the variables of the first rule in the global queue match the input variable. If so, the local controller proceeds. If not, then the compared instance is ignored and the next instance is then compared using the Function State and input variables.

5. If a rule is found in the rule net where the Function State and all the input variables match, the rule is recorded as a possible best match.

6. The local controller must continue to try the next rules until the Function State is unequal. If another rule is found matching, then the local controller makes a decision. The rule with the higher Function State is remembered as the best match.

7. Once all matching rules have been compared, the best matching rule, if there is one, is selected. If a rule matches, then the rule net will broadcast output variables and update the Function State. If the rule net does not find a match it will not broadcast anything.

8. When a rule is selected it is "executed". Execution consists of the following steps. First, the Function State of the rule to be called and the output variables of the selected instance are queued up to be inserted at the tail end of the FIFO global bindery queue. Second, any local variables are processed immediately and affect the local bindery. This includes the Function State and the Counter OverFlow.

9. Part of the broadcast phase is the translation of the Output_to_Input type variable to Input_Type when they are stored in the global queue. Then the data portion of the To_Node, From_Node, and Destination_Addr is stored in the This_Node variable or stored in the Other_Node_Buffer as described above.

10. If the output variable is a Store_Output type which indicates that the variable should be stored, then the local controller checks the variable, if it is either:

A. a From Function or Temporary Buffer handle storage variable, the value is just stored directly in the local bindery. This is usually the first output variable in the global bindery instance.

B. a Parameter Store variable, then each variable's name, value and type from the global bindery are copied into the local bindery. The parameters must be in the same order and of the same number as on the global bindery. Typically they follow the From Function output variable.

11. Many rules have no global bindery output or data which should be returned to the global data memory. These rules in the rule net are processed by the local controller internally, causing the Function State to change without a global broadcast. This allows many rule nets to process without having to contend for the global bindery queue. The queue should be long enough to allow rule nets to broadcast and proceed without blocking. Even in a large system, the global queue is preferably not longer than twenty instances. Longer queues are possible but slow down overall processing and broadcasting cycle, because the global controller is handling too many rule nets.

12. Rules from rule nets may also generate a call to a slave translator. That call is stored on the global bindery along with any parameters that will be operated on.

13. Slave translators recognize rules in the same way that rule net does. First the Function State is matched and then the input variables are matched. Once a slave translator finds a match then the slave rule has a corresponding API and output variables (data from the global data memory) which are sent to the correct API where the data is manipulated by the appropriate conventional slave application (i.e. database, web server, e-mail, etc.).

14. Once the data has been operated on, it is returned through the API interface to the slave translator who broadcasts the data as part of a complete instance broadcast. The data is then returned to the calling net, if the calling net and the slave are not on the same node. The calling net may then either return that data to the global data memory, pass it along in a return call to a rule net, pass the data along in another net call or send it to a slave translator. The action taken by the net depends on the action stored in the next rule which was waiting for the complete message.

The following section is pseudo code for the compiler. It also explains how the rule structures are built and how the rules and slave translator rules are divided.

1. For each Net do a while loop getting tokens of source code.

2. Parse the tokens in a recursive descent parser. An intermediate language can be used to assist in optimization.

3. Every function call, assignment operation, comparison operation, arithmetic calculation, or branching decision generates a series of rules as described above.

4. A call to a slave translator or rule net is created, along with what this rule net number is (the From Function), and any parameters needed for data. Each parameter is usually a buffer handle, or an indirection to a buffer handle via a pointer in another buffer handle. If the rule is to be sent to a single location versus a general broadcast, the use of the To_Node, From_Node, Destination_Addr, From_This_Node, To_This_Node variables are used as described above.

5. Immediate values can be used as parameters. Each of the 16 bit values used as a pair in variables can contain numbers from 0–65535. Anything larger must be stored in a 4 byte integer, or a floating point buffer.

6. Result values are returned in a buffer(s) which are one or more of the parameters.

7. In order to use fewer numbers of parameters, record structures are should be used. Each 256 byte or 4K buffer can contain many variables in a precise configuration. Each buffer number is the first 16 bit half of a parameter variable. Offsets into the buffer for record field locations are in the second 16 bit value. The variable type byte describes whether indirection is used, and the size of the field. For simple buffers with no record structure, the second value is 0.

8. Each function call is followed by two parallel instances. One sets the error Function State for timeout failure, and the other recognizes the Accept response from the receiving rule net or slave translator. In an optimized version, the Accept can be eliminated for address specific instances, which reduces bus and/or network traffic.

9. If the Accepted instance is recognized, then three more parallel instances may follow. If the source code function call is for a parallel execution thread, then there is no pausing for a completion status. Serial execution requires a pause for the Complete status. It will either be a Success, Failure, or Timeout. A failure automatically forces the Function State to the Error Exit location for cleanup. A successful completion sets the Function State to where the next function call starts. A timeout changes the Function State back to the rule which was broadcast from the rule net. After 3 timeouts (the number could change as needed), the timeout goes to Function State Error_Exit. It is permissible to not wait for the Accept, but proceed directly to the Complete, Success, Failure, Timeout set of parallel instances. This is possible for predefined functions which go to a local von Neumann processor for immediate processing, or if the low latency network interconnect is very reliable and packets will not get lost on the network.

10. In the case of a branch decision, the Success or Failure of the comparison causes different Function States to be set, but not to the Error Exit. These function states are derived from a table which saves where the function state and instances are at the start and end of the IF, ELSE, GOTO, DO, FOR and WHILE statements. At the end of parsing each rule net, the table values are loaded into the respective rule variables. This permits forward and backward branching.

11. Each rule net which is compiled also has a sequence of rules generated before and after the body of source function statement calls (i.e. the opening and closing brackets imply some setup and termination activity). For object oriented source languages, such as Java or C++, constructors and destructors or finalizers could formalize the allocation of temporary buffers, initialization of variables and so forth.

12. Each slave translator or rule net sends an Accept broadcast back to the caller Net.

13. Then the rule net calls Get Buffer to ask for the 256 byte temporary work space. It waits for an Accept and a Successful completion instance.

14. The body of the net is executed.

15. At the end of the rules execution the temporary buffer is freed. This also has an Accept and Successful completion wait. A Failure instance is broadcast after the Error_Exit to handle internal rule or rule net call sequence failures. This provides for cascading the timeout or other failures to higher rule net calls for quicker error recovery.

16. The Function State is returned to 0, where the rule net can wait for another call. If another rule net calls this net while in the middle of executing the same thread, the call will only be Accepted if there are multiple local binderies which allow for multiple threads. If a slave translator gets the call, it will queue it up and has a better chance of responding to the call, although the timing may be so long that the caller net may time out.

17. The use of multiple threads in the rule generation by the compiler allows for To_Node, From_Node to handle multiple threads of execution of the same rules.

18. With each set of local bindery registers is the thread number in a register. It is ORed with the middle bits of the To_Node, From_Node, From_This_Node, To_This_Node, Destination_Addr variables to access the correct offset in the Other_Node_Buffer array of Node-Processor-Thread values. At load time the number of threads would have to be set for all rules. This hardware requirement forces the compiler, software developer and global controller to be in synch as to how many threads could be handled.

19. An alternative threading scheme which is more memory intensive is to have the compiler hard code the thread number into multiple rule generations. This would require that complete copies of the rule sets be used in every rule net with local registries. This would require more rule net storage space, but would save in having to automatically OR the thread number in the To_Node, From_Node, From_This_Node, To_This_Node, Destination_Addr variables to access the correct offset in the Other_Node_Buffer array of Node-Processor-Thread values.

20. Because each Function State has a 16 bit limit, and F800 or higher is the error exit area, the number of rules in a single rule net are limited to however many will fit in function states less than F800 (63488). Because many of the instances are parallel and have the same state number, up to 120000 instances may be in a single net. This limits the number of source lines. If 7 to 50 rules are needed per source line, then 2400 to 17000 source lines could exist in one rule net. These estimates demonstrate that large functions as commonly found in commercial software will fit in this parallel machine.

21. The Function State number range of 3000–6FFF gives us 16,383 nets. This is a large enough set of function numbers for a large commercial software package. If larger number ranges were used, such as 32 bits instead of 16 bits, then much larger ranges of predefined functions, net functions, records, etc. could be used.

22. After compilation, the instance sets are stored in binary form on a secondary storage device (hard disk). At execution time they are instantiated from the secondary storage to the DRAM storage on the rule nets.

23. The main net number is specially recorded so that it can be used as the initial global function broadcast to start off the parallel nets.

What is claimed is:

1. A distributed digital rule processor to execute digital rules and create a single system image for a computer program on networked nodes having von Neumann processors comprising:

a plurality of rule nets each having an ordered list of rules, wherein each rule has inputs and outputs;

a plurality of slave translators to execute rules received from the rule nets and return the results and data from executed rules to a calling rule net;

wherein the rule nets can broadcast rules to other rule nets and slave translators based on the rules received from other rule nets;

a global controller coupled to the rule nets and slave translators, having a global bindery with a global data memory, a current rules' queue number, a function state and variables of the next rule to be broadcast to the rule nets and slave translators, and a current broadcast state, wherein the global data memory may only be accessed indirectly by the rule nets through the global controller and program data is only transferred from the global data memory when a rule is broadcast which requires the data, and program data is only updated in global data memory when it is received by a completed rule from a rule net;

a global rule distribution queue coupled to the global controller to store pending digital rules and sequentially broadcast rules to the rule nets and slave translators as signaled by the global controller; and a plurality of local binderies in each rule net, wherein each local bindery has a function state wherein the function state and local binderies cannot be directly accessed by the rules in the rule net or global controller, and wherein the function state allows each rule net to rebroadcast a rule that failed to complete on the node to which the rule was broadcast to thereby allow the program to continue execution without the loss of gray data.

2. The distributed digital rule processor as in claim 1 wherein each rule net further comprises:

at least one local controller coupled to the plurality of local binderies and the global controller, to receive rules broadcast from other rule nets through the global controller and global queue wherein the rules are recognized and executed, and said local controller compares the received rules to the rules stored in a rule net storage to decide which rule to execute and broadcast next, and to generate other digital rules which will be broadcast to other rule nets and slave translators;

wherein the local controller stores the function state of the broadcast rules, local variables and the output variables for digital rules in the local binderies, and the function state can only be accessed by the local controller such that the local bindery cannot be corrupted by the rules in a rule net or the global controller.

3. The distributed digital rule processor as in claim 2 wherein each slave translator further comprises:

at least one slave local controller coupled to the global controller, to receive digital rules from the rule nets broadcast through the global controller and global queue that are recognized and executed, wherein said slave local controller compares the received digital rules to the rules stored in a slave translator storage to decide which rule to execute next and thereby generate a call to slave functionality to perform work on data passed with the rule; and a slave local bindery coupled to each slave local controller to store the function state of the broadcast digital rules, local variables and the output variables for digital rules.

4. The distributed digital rule processor as in claim 3 wherein the slave local bindery coupled to each slave translator further comprises a plurality of local binderies coupled to each local slave controller, to store the state of multiple threads and handle recursion on each respective rule net and slave translator.

5. The distributed digital rule processor as in claim 1 further comprising a broadcasting means coupled to the global queue for broadcasting digital rules to the rule nets and slave translators.

6. The distributed digital rule processor as in claim 1 wherein the digital rules further comprise a conjunction of variables divided into groups of input variables and output variables wherein the rule outputs of a first rule are converted to the rule inputs for a second rule by the global controller and then stored in the global queue for broadcast.

7. A distributed digital rule processor as in claim 1 wherein a rule net will re-broadcast a rule which has not been accepted and completed by another rule net or slave translator.

8. The distributed digital rule processor as in claim 1 wherein the executing copies of the rule nets and slave translators are distributed across several nodes and backed up on at least one networked node.

9. The distributed digital rule processor as in claim 1 wherein the global controller is further comprised of a plurality of global controllers arranged in a hierarchical manner wherein each global controller directs a group of subordinate global controllers and divides the rules for several executing applications between the subordinate global controllers.

10. The distributed digital rule processor as in claim 1 wherein each rule net broadcasts rules on the global bindery and global queue, and waits a specified amount of time to receive an acknowledgment flag from the first rule net or slave translator who accepts the processing of the rule.

11. The distributed digital rule processor as in claim 1 wherein the global bindery broadcasts rules, global data, and receives rules to be stored in the queue.

12. The distributed digital rule processor as in claim 1 wherein the global digital rule distribution queue is a first in first out (FIFO) queue having a maximum number of rule storage positions equal to the number of rule nets in the network.

13. A distributed digital rule processor as in claim 1 further comprising a compiling means for converting programming instructions supplied by a programmer into digital rules which are stored in a rule nets' storage area.

14. The distributed digital rule processor as in claim 3 wherein the global controller, rule net local controllers and slave local controllers are each coupled to an individual von Neumann processor.

15. The distributed digital rule processor as in claim 3 wherein the global controller, rule net local controllers and slave translator local controller share a von Neuman processor.

16. The distributed digital rule processor as in claim 3 wherein the global controller further comprises a plurality of state storage buffers to store a queue number of a rule on the queue, a function state and input variables of the next rule to be broadcast to the rule net local controllers and slave nets, and a current broadcast state.

17. The distributed digital rule processor as in claim 3 wherein the local binderies and slave local binderies further comprise:

a function state buffer to define which group of parallel instructions may be recognized next for execution by the receiving rule net;

a counter overflow unit for storing an object number and the maximum time allowed to the slave translator and rule net to complete processing a rule before a failure is reported;

a rule parameter buffer for storing the parameters received with rule broadcasts from the global controller and global queue;

a from function number buffer to store a number defining the rule net which sent the current rule in the respective thread; and a this node buffer to store the current chassis, and processor number to thereby identify the current rule net against other digital rules received by the rule net and in transmissions to the global controller, other rule nets and slave translators.

18. The distributed digital rule processor as in claim 3 which further comprises:

an Other_Node_Buffer coupled to each local controller and slave local controller to store a source or destination address for each broadcast rule wherein the address further comprises the network chassis and processor node address and wherein the Other_Node_Buffer is readable by the global controller.

19. The distributed digital rule processor as in claim 5 wherein the broadcasting means coupled to queue for broadcasting digital rules to the rule nets and slave translators further comprises a means for broadcasting a network addressing variable with each rule which can determine which one of the rule nets and slave translators will accept execution and processing of the broadcast rule.

20. The distributed digital rule processor as in claim 19 wherein the network addressing variable is able to address nodes selected from the group consisting of the Internet, a Wide Area Network, a Local Area Network, a networked cluster, and processors on a network cluster.

21. The distributed digital rule processor as in claim 6 wherein the digital rules further comprise digital parameters passed to the rule nets and slave translators to indicate constants and the location of data.

22. The distributed digital rule processor as in claim 2 wherein each local controller further comprises:
   a plurality of dynamic global buffers for storing local data received from the global controller wherein said global buffers are visible to the slave translators.

23. A distributed digital rule processor to create a single system image and execute digital rules on networked von Neumann processors comprising:
   a plurality of rule nets each having an ordered list of rules in a rule net storage, wherein each rule has inputs and outputs, the rule nets further comprising:
      a local controller coupled to the rule net storage to recognize broadcast rules; and a local bindery coupled to the local controller to store values, wherein the local bindery further comprises:
         a function state buffer to define which group of parallel instructions may be recognized next for execution by the individual rule net;
         a counter overflow unit for storing an object number and the maximum time allowed to a slave translator or rule net to complete the objects processing before a failure is reported;
         a plurality of rule parameter buffers for storing the parameters broadcast by the global controller with a rule; and
         a from function number buffer to store a number defining the rule net which sent a rule to a receiving rule net;
   a global controller having a global queue, a global bindery to store the state of global queue, and global data, to thereby distribute digital rules and control the flow of digital information between the rule nets;
   an Other Node Buffer to store return addresses of rules broadcast by the rule nets through the global controller and global bindery; and
   a plurality of slave translators each having their own memory, operating system, object handler, and an asynchronous communication connection with the global controller and global bindery wherein the slave translators process rules and data received from the rule nets and return that processed data to the rule nets.

24. The distributed digital rule processor of claim 22 wherein the global queue is a first in first out queue to receive and store rules received from rule nets which are then broadcast other rule nets and slave translators.

25. The distributed digital rule processor of claim 22 wherein the rule nets can call rules in other rule nets, and call rules in slave translators to perform processing on data.

26. A method for distributed digital rule processing to execute digital rules and create a single system image for a computer program on networked nodes having von Neumann processors, the method comprising:
   (a) compiling a plurality of rules;
   (b) storing the rules in a plurality of rule nets;
   (c) broadcasting a first digital rule from a global controller and a global queue;
   (d) accepting the broadcast rule if it is recognized by a specific rule net or slave translator;
   (e) updating a function state stored in one of a plurality of local binderies of the accepting rule net, wherein the function state and local bindery cannot be directly accessed by the rules in the rule net or the global controller;
   (f) processing the digital rule when the rule is accepted by one of the rule nets;
   (g) broadcasting a digital rule generated by the rule net as a result of the rule received by the rule net;
   (h) updating a function state stored in one of a plurality of local binderies of the broadcasting rule net, wherein the function state stores a function state value of the rule broadcast;
   (i) re-broadcasting a rule from a rule net which failed to complete on the node to which the rule was broadcast using the function state stored in the corresponding bindery, to thereby allow the program to continue execution without the loss of gray data;
   (j) storing the broadcast rule in the global queue to be broadcast by the global controller to other rule nets and slave translators;
   (k) accepting the broadcast rule when the rule is recognized by a specific rule net or slave translator;
   (l) processing rules received by a slave translator by calling slave application program interfaces (APIs) having slave von Neuman processors to process the digital rule and return the results to the calling rule net; and
   (m) repeating steps (d) through (l) until the processing of a distributed application is complete.

27. The method as in claim 26 wherein the step (d) of accepting the digital rule further comprises the steps of:
   updating the counter overflow variable to store the amount of time allowed before the execution of the digital rule times out; and
   checking one or more times to see if the execution of the digital rule has timed out.

28. The method as in claim 27 wherein the step of checking one or more times to see if the execution of the digital rule has timed out further comprises the step of setting the function state to an error handling state if the digital rule has not executed and times out.

29. The method as in claim 27 wherein step (g) of broadcasting a digital rule generated by the rule net as a result of the rule received by the rule net further comprises the step of broadcasting program data with the broadcast rule from a global data memory in the global controller wherein the global data memory may only be accessed indirectly by the rule nets through the global controller, and program data is only transferred from the global data memory when a rule is broadcast which requires the data, and program data is only updated in global data memory when it is received by a completed rule from a rule net.

* * * * *